US012777388B2

(12) United States Patent
Purkayastha et al.

(10) Patent No.: US 12,777,388 B2
(45) Date of Patent: Oct. 27, 2026

(54) CHANGING A SENSING SERVICE MANAGEMENT FUNCTION IN ASSOCIATION WITH A USER EQUIPMENT HANDOVER

(71) Applicant: QUALCOMM Incorporated, San Diego, CA (US)

(72) Inventors: Punyaslok Purkayastha, San Diego, CA (US); Simone Merlin, San Diego, CA (US); Gavin Bernard Horn, La Jolla, CA (US); Hong Cheng, Basking Ridge, NJ (US); Miguel Griot, La Jolla, CA (US); Olufunmilola Omolade Awoniyi-Oteri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 324 days.

(21) Appl. No.: 18/534,236

(22) Filed: Dec. 8, 2023

(65) Prior Publication Data

US 2025/0193755 A1 Jun. 12, 2025

(51) Int. Cl.
*H04W 36/12* (2009.01)
*H04W 36/00* (2009.01)

(52) U.S. Cl.
CPC ....... *H04W 36/12* (2013.01); *H04W 36/0079* (2018.08)

(58) Field of Classification Search
CPC . H04W 36/12; H04W 36/0079; H04W 36/16; H04W 36/0005; H04W 4/38; G01S 7/006; G01S 13/003; G01S 13/10; G01S 13/88
See application file for complete search history.

(56) References Cited

U.S. PATENT DOCUMENTS

2024/0276315 A1 8/2024 Zhang
2025/0106710 A1* 3/2025 Takahashi ......... H04W 36/0011
2025/0330786 A1* 10/2025 Li ......................... H04W 36/30

FOREIGN PATENT DOCUMENTS

CN 117177314 A 12/2023
WO 2023078193 A1 5/2023
WO 2023231841 A1 12/2023
WO 2023231921 A1 12/2023

OTHER PUBLICATIONS

English machine translation of WO 2023/231841.*
International Search Report and Written Opinion—PCT/US2024/055117—ISA/EPO—Feb. 26, 2025.

* cited by examiner

*Primary Examiner* — Eric Myers
(74) *Attorney, Agent, or Firm* — Harrity & Harrity LLP

(57) ABSTRACT

Various aspects of the present disclosure generally relate to wireless communication. Some aspects relate to changing a sensing service management function (SnMF) in association with a handover of a UE configured as a sensing unit (SU) for an integrated sensing and communication (ISAC) service. In some aspects, as the SU is handed over to a target cell, a mobility service may request a new configuration associated with the target cell and may facilitate associating the SU with a target SnMF. In some aspects, a common sensing repository may facilitate identifying a target SnMF and associating the SU therewith. In some aspects, an SnMF may track changes in a sensing target and/or area to be sensed and may facilitate changing SnMFs and/or SUs to accommodate the changes.

25 Claims, 16 Drawing Sheets

CHANGING A SENSING SERVICE MANAGEMENT FUNCTION IN ASSOCIATION WITH A USER EQUIPMENT HANDOVER

FIELD OF THE DISCLOSURE

Aspects of the present disclosure generally relate to wireless communication and specifically relate to techniques, apparatuses, and methods associated with changing a sensing service management function in association with a user equipment handover.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

In some examples, a wireless communication network may support a sensing service, such as an integrated sensing and communication (ISAC) service. ISAC provides sensing capabilities (for example, RF sensing capabilities) using the same system and infrastructure that is used for wireless communication. One or more devices (which may be referred to as sensing units (SUs)) in the wireless communication network may perform RF sensing via resources of the wireless communication network (for example, using one or more RF signals). RF sensing enables wireless communication devices to acquire information about characteristics of the environment and/or objects within the environment. In some examples, RF sensing can be used to determine distances (ranges), angles, and/or instantaneous linear velocities, among other examples, of objects in the environment.

The sensing service may be associated with one or more SUs that are configured to perform RF sensing to fulfill one or more sensing requests. In a given wireless communication network, a variety of different devices may be capable of serving as an SU. For example, a user equipment (UE) may be used as an SU and may be configured as either a transmitter or a receiver for an RF sensing operation. The UE may be configured by a radio access network (RAN) for performing sensing tasks as part of the RF sensing operation. While a UE is connected to a serving cell, the UE may be configured to perform sensing tasks, sometimes in conjunction with a transmission reception point (TRP). In some cases, the UE may also move from the serving cell (e.g., a source cell) to another cell (e.g., a target cell), which becomes a new serving cell. In some cases, the existing sensing configuration becomes irrelevant when the UE leaves the source cell and, once connected to the target cell, the UE is configured with a new sensing configuration associated with the target cell, thereby resulting in a gap in the sensing tasks being performed by the UE. Moreover, in some cases, movement of a UE from a source cell to a target cell may result in a change in service area and, thus, a change from an area associated with a first sensing management function (SnMF) network node to an area associated with a second SnMF network node.

SUMMARY

Some aspects described herein relate to a first network node for wireless communication. The first network node may include a processing system that includes one or more processors and one or more memories coupled with the one or more processors. The processing system may be configured to cause the first network node to receive a first message from a sensing unit (SU), the first message comprising a first SU association request associated with a handover of the SU from a first sensing service management function (SnMF) service area to a second SnMF service area, wherein the first SnMF service area is associated with a first SnMF node and the second SnMF service area is associated with a second SnMF node. The processing system may be configured to cause the first network node to transmit a second message to the SU, the second message indicating an SU association acceptance and a first routing identifier (ID) associated with the second SnMF node.

Some aspects described herein relate to a first network node for wireless communication. The first network node may include a processing system that includes one or more processors and one or more memories coupled with the one or more processors. The processing system may be configured to cause the first network node to receive an indication of a first SU association request associated with a handover of an SU from a first sensing SnMF service area to a second SnMF service area, wherein the first SnMF service area is associated with a first SnMF node and the second SnMF service area is associated with a second SnMF node. The processing system may be configured to cause the first network node to transmit an indication of an SU association acceptance and a first routing ID associated with the second SnMF node.

Some aspects described herein relate to a first network node for wireless communication. The first network node may include a processing system that includes one or more processors and one or more memories coupled with the one or more processors. The processing system may be configured to cause the first network node to receive an indication of a first SU association request. The processing system may be configured to cause the first network node to cause the first network node to transmit an indication of an SU association rejection in association with a handover of an SU from a first sensing SnMF service area to a second SnMF service area, wherein the first SnMF service area is associated with a first SnMF node and the second SnMF service area is associated with a second SnMF node, the first network node comprising the first SnMF, wherein the indication of the SU association rejection comprises a first routing ID associated with the second SnMF node.

Some aspects described herein relate to a method for wireless communication by a first network node. The method may include receiving a first message from an SU, the first message comprising a first SU association request associated with a handover of the SU from a first sensing SnMF service area to a second SnMF service area, wherein the first SnMF service area is associated with a first SnMF node and the second SnMF service area is associated with a second SnMF node. The method may include transmitting a second message to the SU, the second message indicating an SU association acceptance and a first routing ID associated with the second SnMF node.

Some aspects described herein relate to a method for wireless communication performed by a first network node. The method may include receiving an indication of a first SU association request associated with a handover of an SU from a first sensing SnMF service area to a second SnMF service area, wherein the first SnMF service area is associated with a first SnMF node and the second SnMF service area is associated with a second SnMF node. The method may include transmitting an indication of an SU association acceptance and a first routing ID associated with the second SnMF node.

Some aspects described herein relate to a method for wireless communication performed by a first network node. The method may include receiving an indication of a first SU association request. The method may include transmitting an indication of an SU association rejection in association with a handover of an SU from a first sensing SnMF service area to a second SnMF service area, wherein the first SnMF service area is associated with a first SnMF node and the second SnMF service area is associated with a second SnMF node, the first network node comprising the first SnMF, wherein the indication of the SU association rejection comprises a first routing ID associated with the second SnMF node.

Some aspects described herein relate to a non-transitory computer-readable medium that stores a set of instructions for wireless communication by a first network node. The set of instructions, when executed by one or more processors of the first network node, may cause the first network node to receive a first message from an SU, the first message comprising a first SU association request associated with a handover of the SU from a first sensing SnMF service area to a second SnMF service area, wherein the first SnMF service area is associated with a first SnMF node and the second SnMF service area is associated with a second SnMF node. The set of instructions, when executed by one or more processors of the first network node, may cause the first network node to transmit a second message to the SU, the second message indicating an SU association acceptance and a first routing ID associated with the second SnMF node.

Some aspects described herein relate to a non-transitory computer-readable medium that stores a set of instructions for wireless communication by a first network node. The set of instructions, when executed by one or more processors of the first network node, may cause the first network node to receive an indication of a first SU association request associated with a handover of an SU from a first sensing SnMF service area to a second SnMF service area, wherein the first SnMF service area is associated with a first SnMF node and the second SnMF service area is associated with a second SnMF node. The set of instructions, when executed by one or more processors of the first network node, may cause the first network node to transmit an indication of an SU association acceptance and a first routing ID associated with the second SnMF node.

Some aspects described herein relate to a non-transitory computer-readable medium that stores a set of instructions for wireless communication by a first network node. The set of instructions, when executed by one or more processors of the first network node, may cause the first network node to receive an indication of a first SU association request. The set of instructions, when executed by one or more processors of the first network node, may cause the first network node to transmit an indication of an SU association rejection in association with a handover of an SU from a first sensing SnMF service area to a second SnMF service area, wherein the first SnMF service area is associated with a first SnMF node and the second SnMF service area is associated with a second SnMF node, the first network node comprising the first SnMF, wherein the indication of the SU association rejection comprises a first routing ID associated with the second SnMF node.

Some aspects described herein relate to an apparatus for wireless communication. The apparatus may include means for receiving a first message from an SU, the first message comprising a first SU association request associated with a handover of the SU from a first sensing SnMF service area to a second SnMF service area, wherein the first SnMF service area is associated with a first SnMF node and the second SnMF service area is associated with a second SnMF node. The apparatus may include means for transmitting a second message to the SU, the second message indicating an SU association acceptance and a first routing ID associated with the second SnMF node.

Some aspects described herein relate to an apparatus for wireless communication. The apparatus may include means for receiving an indication of a first SU association request associated with a handover of an SU from a first sensing SnMF service area to a second SnMF service area, wherein the first SnMF service area is associated with a first SnMF node and the second SnMF service area is associated with a second SnMF node. The apparatus may include means for transmitting an indication of an SU association acceptance and a first routing ID associated with the second SnMF node.

Some aspects described herein relate to an apparatus for wireless communication. The apparatus may include means for receiving an indication of a first SU association request. The apparatus may include means for transmitting an indication of an SU association rejection in association with a handover of an SU from a first sensing SnMF service area to a second SnMF service area, wherein the first SnMF service area is associated with a first SnMF node and the second SnMF service area is associated with a second SnMF node, the apparatus comprising the first SnMF, wherein the indication of the SU association rejection comprises a first routing ID associated with the second SnMF node.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

DETAILED DESCRIPTION

Figure 1:
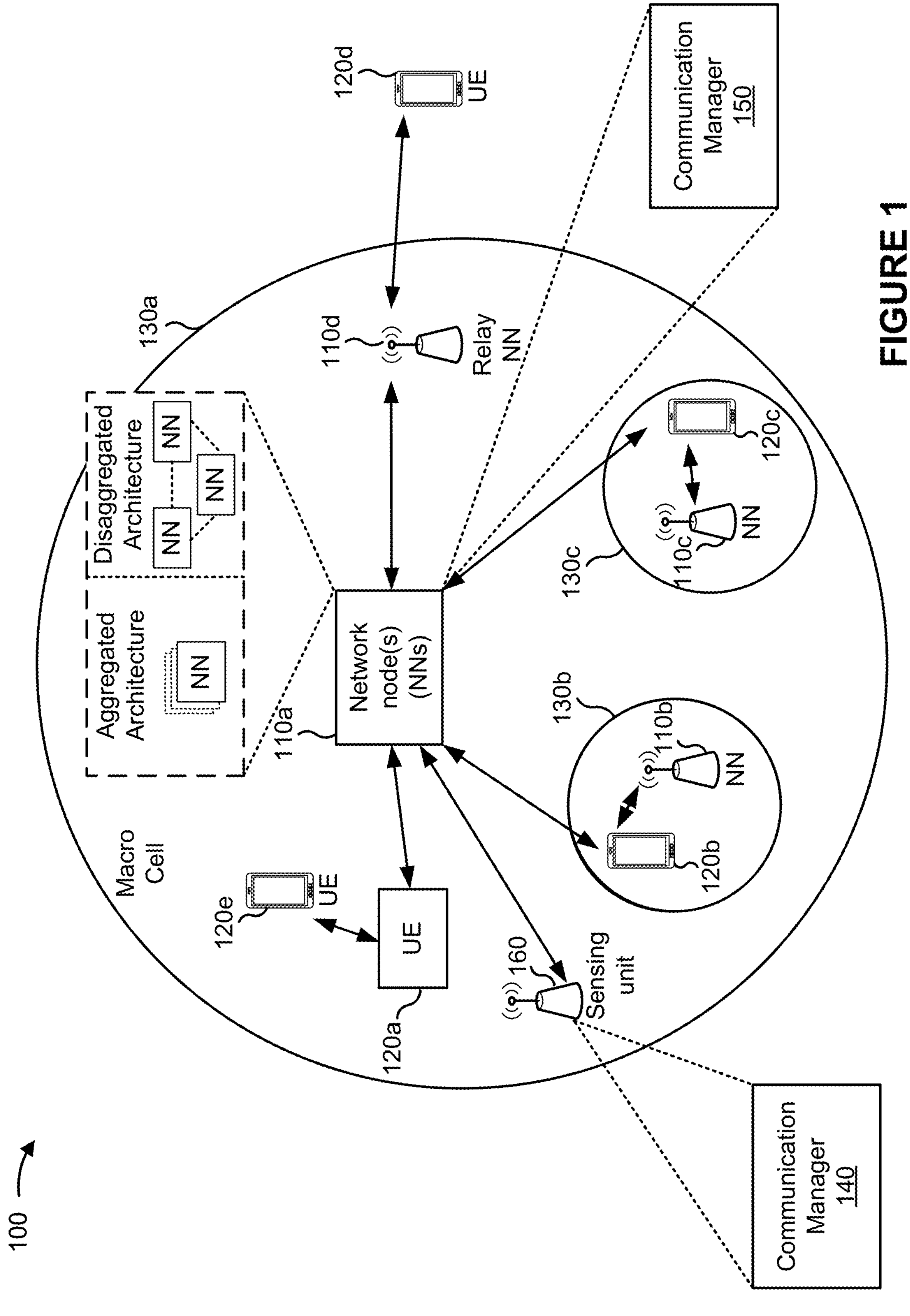
FIG. 1 is a diagram illustrating an example of a wireless communication network in accordance with the present disclosure.

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to user equipment (UE) handover and associated changes in configuration for a sensing service. Some aspects more specifically relate to changing a sensing service management function (SnMF) in association with a handover of a UE configured as a sensing unit (SU) for an integrated sensing and communication (ISAC) service. In some aspects, as the UE is handed over to the target cell, the target radio access network (RAN) node, or a mobility service, may request, of the SnMF, a new configuration associated with the target cell. The target SnMF may contact the source SnMF to receive the necessary context to configure the target RAN node and/or the UE. The mobility service may forward the handover request to the selected target RAN node, which may provide a handover indication to the source SnMF. The source SnMF may provide information to the target RAN node that may be used by the target RAN node to configure itself and/or the UE for continuing the sensing operations in association with a target cell provided by the target RAN node. However, if the mobility service is unable to route the request to the target SnMF, then the SnMF that receives the association request may reject the request and provide in its response the target SnMF address information. The UE may then initiate another association request associated with the provided target SnMF address.

In some aspects, a sensing repository (SR) function network node (sometimes referred to as a common UE repository) may be configured to maintain information about sensing UEs. Multiple SnMF network nodes may register with the SR network node. The SR network node may be configured to notify an SnMF network node if a UE is entering or leaving a service area associated with the SnMF network node. In some aspects, a mobility service that serves the UE may notify the SR network node when the mobility service receives an association request from the UE. For example, the mobility service may route the association request, including an indication of a location of the UE, to the SR, which may identify, based on the location of the UE, a target SnMF. The SR may notify the target SnMF that the UE is entering a service area associated with the target SnMF, thereby associating the UE with the target SnMF. The target SnMF may then configure the UE for sensing in the new SnMF service area. The SR also may notify the source SnMF of the change of service area of the UE.

In some aspects, areas that are being sensed may change over time. A change in an area to be sensed may result in a change in an SnMF associated with the sensing service. For example, in some aspects, a source SnMF and/or a target SnMF may determine that a new area is to be sensed and, as a result, may determine that a change in serving SnMF is needed. In some aspects, as a sensing area changes, UEs to be configured for sensing may be changed. For example, in some aspects, a source SnMF may determine that a first UE is no longer to be configured for sensing and/or that a second UE (which was not previously configured for sensing) is to be configured for sensing.

Particular aspects of the subject matter described in this disclosure can be implemented to realize one or more of the following potential advantages. In some examples, the described techniques can be used to ensure that handovers in which a UE moves from a source cell to a target cell associated with a new SnMF are performed while minimizing interruptions to a sensing session. For example, by providing target SnMF address information to a mobility service with a rejection of an association request, the described techniques can be used to facilitate a change in a serving SnMF resulting from a UE handover from a source cell to a target cell, thereby reducing interruptions to a sensing service as a result of the UE handover. In some aspects, by configuring an SR to maintain information about sensing UEs and registered SnMFs, the described techniques can be used to reduce signaling overhead, processing overhead, and/or latency associated with a target RAN node in preparing for a handover of a UE to the target cell, in which a sensing session is to be continued. For example, by configuring an SR network node to notify a target SnMF of a change in service area, the described techniques may enable a target SnMF to prepare for the UE handover, thereby mitigating interruptions to a sensing service due to UE handovers that result in changes in sensing service areas. In some aspects, by configuring SnMF network nodes to determine that a new area is to be sensed, the described techniques may enable changes in SnMF associations and/or configurations of UEs for sensing while minimizing interruptions to the sensing service.

Multiple-access radio access technologies (RATs) have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (eMBB), ultra-reliable low-latency communication (URLLC), massive machine-type communication (mMTC), millimeter wave (mmWave) technology, beamforming, network slicing, edge computing, Internet of Things (IoT) connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) UE functionality, industrial connectivity, multiple-subscriber implementations, high-precision positioning, radio frequency (RF) sensing, and/or artificial intelligence or machine learning (AI/ML), among other examples. These technological improvements may support use cases such as wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases.

FIG. 1 is a diagram illustrating an example of a wireless communication network 100 in accordance with the present disclosure. The wireless communication network 100 may be or may include elements of a 5G (or NR) network or a 6G network, among other examples. The wireless communication network 100 may include multiple network nodes 110, shown as a network node (NN) 110*a*, a network node 110*b*, a network node 110*c*, and a network node 110*d*. The network nodes 110 may support communications with multiple UEs 120, shown as a UE 120*a*, a UE 120*b*, a UE 120*c*, a UE 120*d*, and a UE 120*e*.

The network nodes 110 and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless networks 100 may be deployed in a given geographic area. Each wireless communication network 100 may support a particular radio access technology (RAT) (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHZ), FR2 (24.25 GHz through 52.6 GHZ), FR3 (7.125 GHZ through 24.25 GHZ), FR4a or FR4-1 (52.6 GHz through 71 GHZ), FR4 (52.6 GHZ through 114.25 GHZ), and FR5 (114.25 GHz through 300 GHz). Although a portion of FR1 is greater than 6 GHZ, FR1 is often referred to (interchangeably) as a "Sub-6 GHz" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHZ," if used herein, may broadly refer to frequencies that are less than 6 GHZ, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 100 may implement dynamic spectrum sharing (DSS), in which multiple RATs (for example, 4G/LTE and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

A network node 110 may include one or more devices, components, or systems that enable communication between a UE 120 and one or more devices, components, or systems of the wireless communication network 100. A network node 110 may be, may include, or may also be referred to as an NR network node, a 5G network node, a 6G network node, a Node B, an eNB, a gNB, an access point (AP), a transmission reception point (TRP), a mobility element, a core, a network entity, a network element, a network equipment, and/or another type of device, component, or system included in a radio access network (RAN).

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node (having an aggregated architecture), meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may implement a radio protocol stack that is physically distributed and/or logically distributed among two or more nodes in the same geographic location or in different geographic locations. For example, a disaggregated network node may have a disaggregated architecture. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 110 of the wireless communication network 100 may include one or more central units (CUs), one or more distributed units (DUs), and/or one or more radio units (RUs). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (iFFT), beamforming, physical random access channel (PRACH) extraction and filtering, and/or scheduling of resources for one or more UEs 120, among other examples. An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a single network node 110 may include a combination of one or more CUs, one or more DUs, and/or one or more RUs. Additionally or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In some examples, a cell may not necessarily be stationary. For example, the geographic area of the cell may move according to the location of an associated mobile network node 110 (for example, a train, a satellite base station, an unmanned aerial vehicle, or a non-terrestrial network (NTN) network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110*a* may be a macro network node for a macro cell 130*a*, the network node 110*b* may be a pico network node for a pico cell 130*b*, and the network node 110*c* may be a femto network node for a femto cell 130*c*. Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink channels may include one or more control channels and one or more data channels. A downlink control channel may be used to transmit downlink control information (DCI) (for example, scheduling information, reference signals, and/or configuration information) from a network node 110 to a UE 120. A downlink data channel may be used to transmit downlink data (for example, user data associated with a UE 120) from a network node 110 to a UE 120. Downlink control channels may include one or more physical downlink control channels (PDCCHs), and downlink data channels may include one or more physical downlink shared channels (PDSCHs). Uplink channels may similarly include one or more control channels and one or more data channels. An uplink control channel may be used to transmit uplink control information (UCI) (for example, reference signals and/or feedback corresponding to one or more downlink transmissions) from a UE 120 to a network node 110. An uplink data channel may be used to transmit uplink data (for example, user data associated with a UE 120) from a UE 120 to a network node 110. Uplink control channels may include one or more physical uplink control channels (PUCCHs), and uplink data channels may include one or more physical uplink shared channels (PUSCHs). The downlink and the uplink may each include a set of resources on which the network node 110 and the UE 120 may communicate.

Downlink and uplink resources may include time domain resources (frames, subframes, slots, and/or symbols), frequency domain resources (frequency bands, component carriers, subcarriers, resource blocks, and/or resource elements), and/or spatial domain resources (particular transmit directions and/or beam parameters). Frequency domain resources of some bands may be subdivided into bandwidth parts (BWPs). A BWP may be a continuous block of frequency domain resources (for example, a continuous block of resource blocks) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a DCI configuration to the one or more UEs 120) and/or reconfigured, which means that a BWP can be adjusted in real-time (or near-real-time) based on changing network conditions in the wireless communication network 100 and/or based on the specific requirements of the one or more UEs 120. This enables more efficient use of the available frequency domain resources in the wireless communication network 100 because fewer frequency domain resources may be allocated to a BWP for a UE 120 (which may reduce the quantity of frequency domain resources that a UE 120 is required to monitor), leaving more frequency domain resources to be spread across multiple UEs 120. Thus, BWPs may also assist in the implementation of lower-capability UEs 120 by facilitating the configuration of smaller bandwidths for communication by such UEs 120.

As described above, in some aspects, the wireless communication network 100 may be, may include, or may be included in, an IAB network. In an IAB network, at least one network node 110 is an anchor network node that communicates with a core network. An anchor network node 110 may also be referred to as an IAB donor (or "IAB-donor"). The anchor network node 110 may connect to the core network via a wired backhaul link. For example, an Ng interface of the anchor network node 110 may terminate at the core network. Additionally or alternatively, an anchor network node 110 may connect to one or more devices of the core network that provide a core access and mobility management function (AMF). An IAB network also generally includes multiple non-anchor network nodes 110, which may also be referred to as relay network nodes or simply as IAB nodes (or "IAB-nodes"). Each non-anchor network node 110 may communicate directly with the anchor network node 110 via a wireless backhaul link to access the core network, or may communicate indirectly with the anchor network node 110 via one or more other non-anchor network nodes 110 and associated wireless backhaul links that form a backhaul path to the core network. Some anchor network node 110 or other non-anchor network node 110 may also communicate directly with one or more UEs 120 via wireless access links that carry access traffic. In some examples, network resources for wireless communication (such as time resources, frequency resources, and/or spatial resources) may be shared between access links and backhaul links.

In some examples, any network node 110 that relays communications may be referred to as a relay network node, a relay station, or simply as a relay. A relay may receive a transmission of a communication from an upstream station (for example, another network node 110 or a UE 120) and transmit the communication to a downstream station (for example, a UE 120 or another network node 110). In this case, the wireless communication network 100 may include or be referred to as a "multi-hop network." In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. Additionally or alternatively, a UE 120 may be or may operate as a relay station that can relay transmissions to or from other UEs 120. A UE 120 that relays communications may be referred to as a UE relay or a relay UE, among other examples.

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an extended reality (XR) device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 and/or a network node 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

Some UEs 120 may be considered machine-type communication (MTC) UEs, evolved or enhanced machine-type communication (eMTC), UEs, further enhanced eMTC (feMTC) UEs, or enhanced feMTC (efeMTC) UEs, or further evolutions thereof, all of which may be simply referred to as "MTC UEs"). An MTC UE may be, may include, or may be included in or coupled with a robot, an uncrewed aerial vehicle, a remote device, a sensor, a meter, a monitor, and/or a location tag. Some UEs 120 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 120 may be considered Customer Premises Equipment, which may include telecommunications devices that are installed at a customer location (such as a home or office) to enable access to a service provider's network (such as included in or in communication with the wireless communication network 100).

Some UEs 120 may be classified according to different categories in association with different complexities and/or different capabilities. UEs 120 in a first category may facilitate massive IoT in the wireless communication network 100, and may offer low complexity and/or cost relative to UEs 120 in a second category. UEs 120 in a second category may include mission-critical IoT devices, legacy UEs, baseline UEs, high-tier UEs, advanced UEs, full-capability UEs, and/or premium UEs that are capable of ultra-reliable low-latency communication (URLLC), enhanced mobile broadband (eMBB), and/or precise positioning in the wireless communication network 100, among other examples. A third category of UEs 120 may have mid-tier complexity and/or capability (for example, a capability between UEs 120 of the first category and UEs 120 of the second capability). A UE 120 of the third category may be referred to as a reduced capacity UE ("RedCap UE"), a mid-tier UE, an NR-Light UE, and/or an NR-Lite UE, among other examples. RedCap UEs may bridge a gap between the capability and complexity of NB-IoT devices and/or eMTC UEs, and mission-critical IoT devices and/or premium UEs. RedCap UEs may include, for example, wearable devices, IoT devices, industrial sensors, and/or cameras that are associated with a limited bandwidth, power capacity, and/or transmission range, among other examples. RedCap UEs may support healthcare environments, building automation, electrical distribution, process automation, transport and logistics, and/or smart city deployments, among other examples.

In some examples, a UE 120 in the third category (a RedCap UE) may support lower latency communication than a UE 120 in the first category (an NB-IoT UE or an eMTC UE), and a UE 120 in the second category (a mission-critical IoT UE or a premium UE) may support lower latency communication than the UE 120 in the third category. Additionally or alternatively, in some examples, a UE 120 in the third category (a RedCap UE) may support higher wireless communication throughput than a UE 120 in the first category (an NB-IoT UE or an eMTC UE), and a UE 120 in the second category (a mission-critical IoT UE or a premium UE) may support higher wireless communication throughput than the UE 120 in the third category. Additionally or alternatively, in some examples, a UE 120 in the first category (an NB-IoT UE or an eMTC UE) may support longer battery life than a UE 120 in the third category (a RedCap UE), and the UE 120 in the third category may support longer battery life than a UE 120 in the second category (a mission-critical IoT UE or a premium UE).

In some examples, a UE 120 of the third category (a RedCap UE) may have capabilities that satisfy first device or performance requirements but not second device or performance requirements (such as parameters specified for NR UEs 120 other than UEs 120 of the third category), while a UE 120 of the second category (a mission-critical IoT UE or a premium UE) may have capabilities that satisfy the second device or performance requirements (and also the first device or performance requirements, in some examples). For example, a UE 120 of the third category may support a lower maximum modulation and coding scheme (MCS) (for example, a modulation scheme such as quadrature phase shift keying (QPSK)) than an MCS supported by a UE 120 of the second category (for example, a modulation scheme such as 256-quadrature amplitude modulation (QAM)). As another example, a UE of the third category may support a lower maximum transmit power than a maximum transmit power of a UE of the second category. As another example, a UE 120 of the third category may have a less advanced beamforming capability than a beamforming capability of a UE 120 of the second category (for example, a RedCap UE may not be capable of forming as many beams as a premium UE). As another example, a UE 120 of the third category may require a longer processing time than a processing time of a UE 120 of the second category. As another example, a UE 120 of the third category may include less hardware or less complex hardware (such as fewer antennas, fewer transmit antennas, and/or fewer receive antennas) than a UE 120 of the second category. As another example, a UE 120 of the third category may not be capable of communicating on as wide of a maximum BWP as a UE 120 of the second category.

In some examples, two or more UEs 120 (for example, shown as UE 120*a* and UE 120*c*) may communicate directly with one another using sidelink communications (for example, without communicating by way of a network node 110 as an intermediary). As an example, the UE 120*a* may directly transmit data, control information, or other signaling as a sidelink communication to the UE 120*c*. This is in contrast to, for example, the UE 120*a* first transmitting data in an UL communication to a network node 110, which then transmits the data to the UE 120*e* in a DL communication. In various examples, the UEs 120 may transmit and receive sidelink communications using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols. In some deployments and configurations, a network node 110 may schedule and/or allocate resources for sidelink communications between UEs 120 in the wireless communication network 100. In some other deployments and configurations, a UE 120 (instead of a network node 110) may perform, or collaborate or negotiate with one or more other UEs to perform, scheduling operations, resource selection operations, and/or other operations for sidelink communications.

In various examples, some of the network nodes 110 and the UEs 120 of the wireless communication network 100 may be configured for full-duplex operation in addition to half-duplex operation. A network node 110 or a UE 120 operating in a half-duplex mode may perform only one of transmission or reception during particular time resources, such as during particular slots, symbols, or other time periods. Half-duplex operation may involve time-division duplexing (TDD), in which DL transmissions of the network node 110 and UL transmissions of the UE 120 do not occur in the same time resources (that is, the transmissions do not overlap in time). In contrast, a network node 110 or a UE 120 operating in a full-duplex mode can transmit and receive communications concurrently (for example, in the same time resources). By operating in a full-duplex mode, network nodes 110 and/or UEs 120 may generally increase the capacity of the network and the radio access link. In some examples, full-duplex operation may involve frequency-division duplexing (FDD), in which DL transmissions of the network node 110 are performed in a first frequency band or on a first component carrier and transmissions of the UE 120 are performed in a second frequency band or on a second component carrier different than the first frequency band or the first component carrier, respectively. In some examples, full-duplex operation may be enabled for a UE 120 but not for a network node 110. For example, a UE 120 may simultaneously transmit an UL transmission to a first network node 110 and receive a DL transmission from a second network node 110 in the same time resources. In some other examples, full-duplex operation may be enabled for a network node 110 but not for a UE 120. For example, a network node 110 may simultaneously transmit a DL transmission to a first UE 120 and receive an UL transmission from a second UE 120 in the same time resources. In some other examples, full-duplex operation may be enabled for both a network node 110 and a UE 120.

In some examples, the UEs 120 and the network nodes 110 may perform MIMO communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as multi-user MIMO (MU-MIMO). Some radio access technologies (RATs) may employ advanced MIMO techniques, such as mTRP operation (including redundant transmission or reception on multiple TRPs), reciprocity in the time domain or the frequency domain, single-frequency-network (SFN) transmission, or non-coherent joint transmission (NC-JT).

In some examples, the wireless communication network 100 may support an integrated sensing and communication (ISAC) service. ISAC may refer to a system that provides sensing capabilities (for example, RF sensing capabilities) using the same system and infrastructure (for example, the wireless communication network 100) that is used for communication. ISAC may sometimes be referred to as joint communication and radar (JCR). One or more devices in the wireless communication network 100, such as a UE 120, a network node 110, and/or an SU 160, may perform RF sensing via the wireless communication network 100 (for example, using one or more RF signals). RF sensing is a technology that enables wireless communication devices to acquire information about characteristics of the environment and/or objects within the environment. RF sensing uses RF signals to determine the distance (range), angle, and/or instantaneous linear velocity, among other examples, of objects. RF sensing may provide a range of functionality for wireless communication devices, such as object detection, object recognition (for example, vehicle, human, or animal), object tracking, environment monitoring, motion monitoring, high accuracy localization, health monitoring, immersive XR application, home monitoring, weather monitoring, automotive operations (for example, maneuvering, navigation, and/or parking), pedestrian and/or obstacle monitoring for roadways and/or railways, unmanned ariel vehicle (UAV) operations (for example, UAV intrusion detection, UAV tracking, and/or collision avoidance), industrial operations (for example, automated guided vehicles (AGV), automated robots, and/or pedestrian monitoring), tracking, and/or activity recognition, among other examples.

RF sensing may include communication-assisted sensing and/or sensing-assisted communication. Communication-assisted sensing may refer to a wireless communication device, such as an SU 160, performing RF sensing using one or more hardware components and/or radio resources that are associated with communication. For example, the SU 160 may obtain information indicative of characteristics of the environment and/or objects withing the environment using RF signals (for example, NR RF signals or other RF signals associated with wireless communication). Sensing-assisted communication may refer to a wireless communication device using sensing results to perform one or more communication operations. For example, sensing results may improve communication performance, such as by enabling more accurate beamforming, faster beam failure recovery, and/or reduced overhead for channel state information (CSI) tracking, among other examples.

For example, the wireless communication network 100 may include one or more SUs 160. An SU 160 may include a UE 120, a network node 110, a TRP, an IAB node, a RAN node, and/or another wireless communication device capable of performing RF sensing. In some examples, an SU 160 may obtain sensing data via radio signals (sometimes referred to as 3GPP sensing data, 5G wireless sensing data, 6G wireless sensing data, or wireless sensing data). Additionally or alternatively, the SU 160 may obtain sensing data via one or more sensors, such as a camera, a video recorder, a light detection and ranging (LiDAR) sensor, a radar, and/or a sonar sensor, among other examples. For example, the SU 160 may obtain sensing data via Wi-Fi sensing, radar sensing, and/or another type of sensing. Sensing data obtained via a sensor (sometimes referred to as non-3GPP sensing data) may be used by the SU 160 (or another device) to determine characteristics of objects and/or characteristics of the environment. The non-3GPP sensing data may be used to achieve improved sensing results for wireless sensing performed by the SU 160.

The wireless communication network 100 may include one or more network nodes 170. A network node 170 may include a core network node, a core network entity, and/or a core network function, among other examples. A network node 170 may include an SnMF entity, an AMF entity, a mobility service, a gateway, a network repository function (for example, one or more SRs), among other examples. The SnMF entity may perform one or more operations for configuring, managing, and/or maintaining sensor configurations for one or sensing requests. For example, a network node 170 may obtain a sensing request from a client device (for example, a server device or a sensing client) and configure one or more SUs 160 to perform RF sensing to obtain sensing data in accordance with the sensing request, as described in more detail elsewhere herein. As shown in FIG. 1, a network node 170 may communicate with an SU 160 (for example, directly and/or via a network node 110) to configure and/or manage an RF sensing operation.

In some aspects, a network node (e.g., the network node 110) may include a communication manager 150. As described in more detail elsewhere herein, the communication manager 150 may receive a first message from a sensing unit (SU), the first message comprising a first SU association request associated with a handover of the SU from a first sensing service management function (SnMF) service area to a second SnMF service area, wherein the first SnMF service area is associated with a first SnMF node and the second SnMF service area is associated with a second SnMF node; and transmit a second message to the SU, the second message indicating an SU association acceptance and a first routing identifier (ID) associated with the second SnMF node. Additionally, or alternatively, the communication manager 150 may perform one or more other operations described herein.

In some aspects, the communication manager 150 may receive an indication of a first SU association request associated with a handover of an SU from a first SnMF service area to a second SnMF service area, wherein the first SnMF service area is associated with a first SnMF node and the second SnMF service area is associated with a second SnMF node; and transmit an indication of an SU association acceptance and a first routing ID associated with the second SnMF node. Additionally, or alternatively, the communication manager 150 may perform one or more other operations described herein.

In some aspects, the communication manager 150 may receive an indication of a first SU association request; and transmit an indication of an SU association rejection in association with a handover of an SU from a first SnMF service area to a second SnMF service area, wherein the first SnMF service area is associated with a first SnMF node and the second SnMF service area is associated with a second SnMF node, the first network node comprising the first SnMF, wherein the indication of the SU association rejection comprises a first routing ID associated with the second SnMF node. Additionally, or alternatively, the communication manager 150 may perform one or more other operations described herein.

Figure 2:
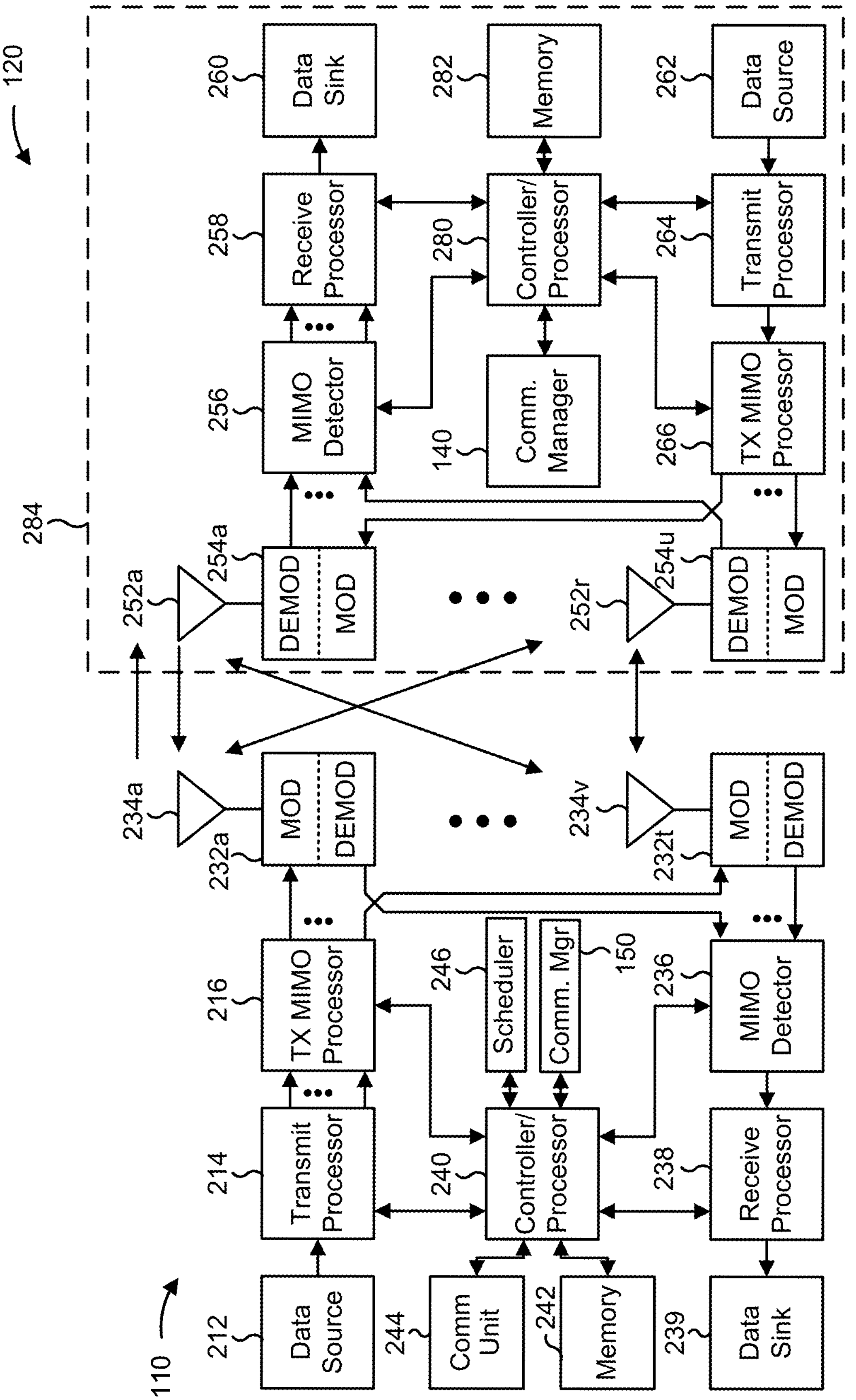
FIG. 2 is a diagram illustrating an example network node in communication with an example user equipment (UE) in a wireless network in accordance with the present disclosure.

FIG. 2 is a diagram illustrating an example network node 110 in communication with an example UE 120 in a wireless network in accordance with the present disclosure.

As shown in FIG. 2, the network node 110 may include a data source 212, a transmit processor 214, a transmit (TX) MIMO processor 216, a set of modems 232 (shown as 232*a* through 232*t*, where t≥1), a set of antennas 234 (shown as 234*a* through 234*v*, where v≥1), a MIMO detector 236, a receive processor 238, a data sink 239, a controller/processor 240, a memory 242, a communication unit 244, a scheduler 246, and/or a communication manager 150, among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 110. The transceiver may be under control of and used by one or more processors, such as the controller/processor 240, and in some aspects in conjunction with processor-readable code stored in the memory 242, to perform aspects of the methods, processes, and/or operations described herein. In some aspects, the network node 110 may include one or more interfaces, communication components, and/or other components that facilitate communication with the UE 120 or another network node.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 214, TX MIMO processor 216, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, operation described as being performed by one or more memories can be performed by the same subset of the one or more memories or different subsets of the one or more memories.

For downlink communication from the network node 110 to the UE 120, the transmit processor 214 may receive data ("downlink data") intended for the UE 120 (or a set of UEs that includes the UE 120) from the data source 212 (such as a data pipeline or a data queue). In some examples, the transmit processor 214 may select one or more MCSs for the UE 120 in accordance with one or more channel quality indicators (CQIs) received from the UE 120. The network node 110 may process the data (for example, including encoding the data) for transmission to the UE 120 on a downlink in accordance with the MCS(s) selected for the UE 120 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing ((OFDM)) to obtain an output sample stream. Each modem 232 may further use the respective modulator component to process (for example, convert to analog, amplify, filter, and/or upconvert) the output sample stream to obtain a time domain downlink signal. The modems 232*a* through 232*t* may together transmit a set of downlink signals (for example, T downlink signals) via the corresponding set of antennas 234.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 100. A data stream (for example, from the data source 212) may be encoded into multiple TBs for transmission over the air interface. The quantity of TBs used to carry the data associated with a particular data stream may be associated with a TB size common to the multiple TBs. The TB size may be based on or otherwise associated with radio channel conditions of the air interface, the MCS used for encoding the data, the downlink resources allocated for transmitting the data, and/or another parameter.

In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 120 to the network node 110, uplink signals from the UE 120 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 110 may use the scheduler 246 to schedule one or more UEs 120 for downlink or uplink communications. In some aspects, the scheduler 246 may use DCI to dynamically schedule DL transmissions to the UE 120 and/or UL transmissions from the UE 120. In some examples, the scheduler 246 may allocate recurring time domain resources and/or frequency domain resources that the UE 120 may use to transmit and/or receive communications using an RRC configuration (for example, a semi-static configuration), for example, to perform semi-persistent scheduling (SPS) or to configure a configured grant (CG) for the UE 120.

One or more of the transmit processor 214, the TX MIMO processor 216, the modem 232, the antenna 234, the MIMO detector 236, the receive processor 238, and/or the controller/processor 240 may be included in an RF chain of the network node 110. An RF chain may include one or more filters, mixers, oscillators, amplifiers, analog-to-digital converters (ADCs), and/or other devices that convert between an analog signal (such as for transmission or reception via an air interface) and a digital signal (such as for processing by one or more processors of the network node 110). In some aspects, the RF chain may be or may be included in a transceiver of the network node 110.

In some examples, the network node 110 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 110 may use the communication unit 244 to transmit and/or receive data associated with the UE 120 or to perform network control signaling, among other examples. The communication unit 244 may include a transceiver and/or an interface, such as a network interface.

The UE 120 may include a set of antennas 252 (shown as antennas 252*a* through 252*r*, where r≥1), a set of modems 254 (shown as modems 254*a* through 254*u*, where u≥1), a MIMO detector 256, a receive processor 258, a data sink 260, a data source 262, a transmit processor 264, a TX MIMO processor 266, a controller/processor 280, a memory 282, and/or a communication manager 140, among other examples. One or more of the components of the UE 120 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 120. The transceiver may be under control of and used by one or more processors, such as the controller/processor 280, and in some aspects in conjunction with processor-readable code stored in the memory 282, to perform aspects of the methods, processes, or operations described herein. In some aspects, the UE 120 may include another interface, another communication component, and/or another component that facilitates communication with the network node 110 and/or another UE 120.

For downlink communication from the network node 110 to the UE 120, the set of antennas 252 may receive the downlink communications or signals from the network node 110 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 120 to the data sink 260 (which may include a data pipeline, a data queue, and/or an application executed on the UE 120), and may provide decoded control information and system information to the controller/processor 280.

For uplink communication from the UE 120 to the network node 110, the transmit processor 264 may receive and process data ("uplink data") from a data source 262 (such as a data pipeline, a data queue, and/or an application executed on the UE 120) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 110 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a channel quality indicator (CQI) parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 120 by the network node 110.

The transmit processor 264 may generate reference symbols for one or more reference signals, such as an uplink DMRS, an uplink SRS, and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, U output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254*a* through 254*u* may transmit a set of uplink signals (for example, R uplink signals or U uplink symbols) via the corresponding set of antennas 252. An uplink signal may include a UCI communication, a MAC-CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 120) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 120 or network nodes 110 may include different numbers of antenna elements. For example, a UE 120 may include a single antenna element, two antenna elements, four antenna elements, eight antenna elements, or a different number of antenna elements. As another example, a network node 110 may include eight antenna elements, 24 antenna elements, 64 antenna elements, 128 antenna elements, or a different number of antenna elements. Generally, a larger number of antenna elements May provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

Figure 3:
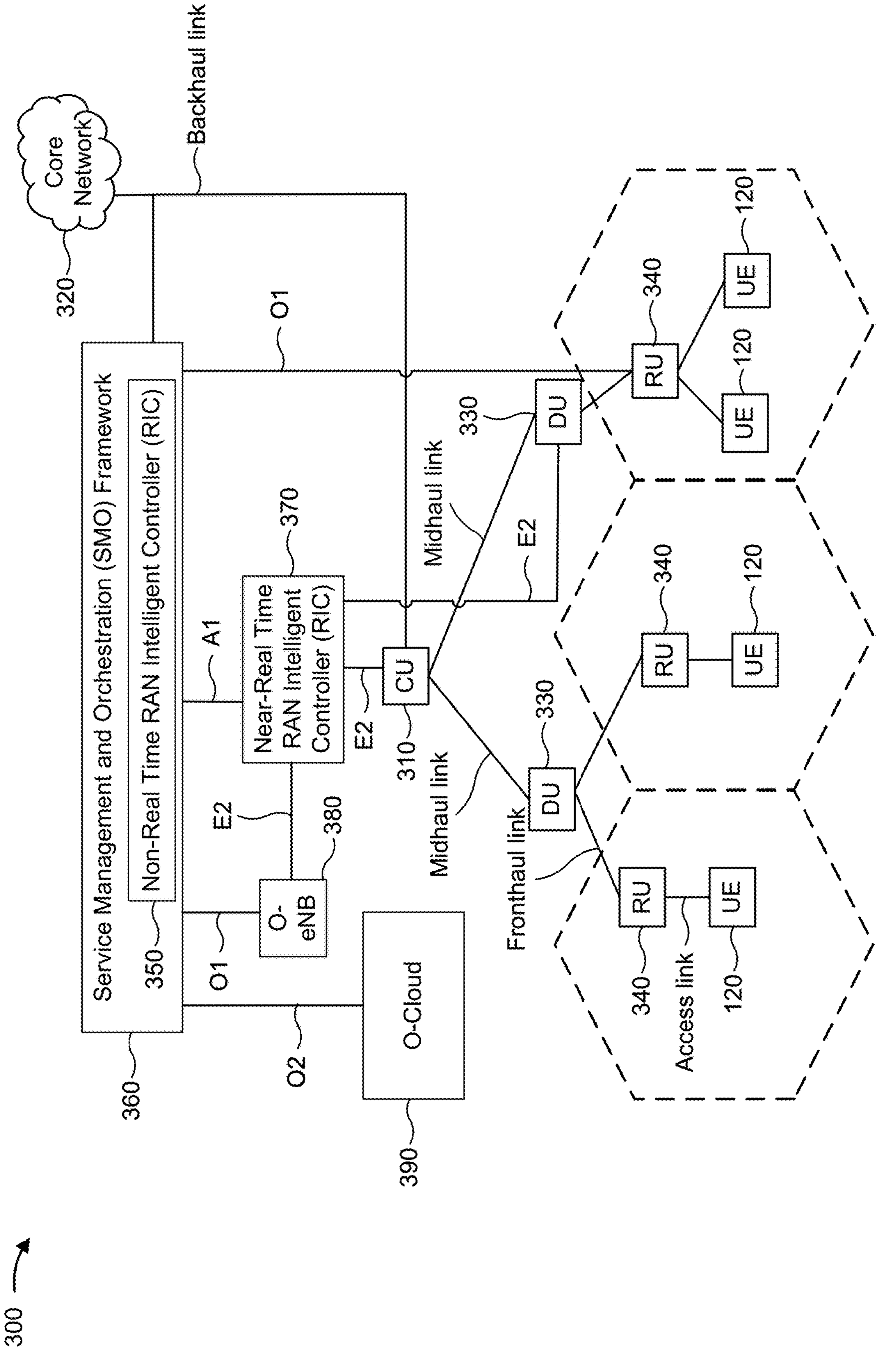
FIG. 3 is a diagram illustrating an example disaggregated base station architecture in accordance with the present disclosure.

FIG. 3 is a diagram illustrating an example disaggregated base station architecture 300 in accordance with the present disclosure. One or more components of the example disaggregated base station architecture 300 may be, may include, or may be included in one or more network nodes (such one or more network nodes 110). The disaggregated base station architecture 300 may include a CU 310 that can communicate directly with a core network 320 via a backhaul link, or that can communicate indirectly with the core network 320 via one or more disaggregated control units, such as a Non-RT RIC 350 associated with a Service Management and Orchestration (SMO) Framework 360 and/or a Near-RT RIC 370 (for example, via an E2 link). The CU 310 may communicate with one or more DUs 330 via respective midhaul links, such as via F1 interfaces. Each of the DUs 330 may communicate with one or more RUs 340 via respective fronthaul links. Each of the RUs 340 may communicate with one or more UEs 120 via respective RF access links. In some deployments, a UE 120 may be simultaneously served by multiple RUs 340.

Each of the components of the disaggregated base station architecture 300, including the CUS 310, the DUs 330, the RUs 340, the Near-RT RICs 370, the Non-RT RICs 350, and the SMO Framework 360, may include one or more interfaces or may be coupled with one or more interfaces for receiving or transmitting signals, such as data or information, via a wired or wireless transmission medium.

In some aspects, the CU 310 may be logically split into one or more CU-UP units and one or more CU-CP units. A CU-UP unit may communicate bidirectionally with a CU-CP unit via an interface, such as the E1 interface when implemented in an O-RAN configuration. The CU 310 may be deployed to communicate with one or more DUs 330, as necessary, for network control and signaling. Each DU 330 may correspond to a logical unit that includes one or more base station functions to control the operation of one or more RUs 340. For example, a DU 330 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 330, or for communicating signals with the control functions hosted by the CU 310. Each RU 340 may implement lower layer functionality. In some aspects, real-time and non-real-time aspects of control and user plane communication with the RU(s) 340 may be controlled by the corresponding DU 330.

The SMO Framework 360 may support RAN deployment and provisioning of non-virtualized and virtualized network elements. For non-virtualized network elements, the SMO Framework 360 may support the deployment of dedicated physical resources for RAN coverage requirements, which may be managed via an operations and maintenance interface, such as an O1 interface. For virtualized network elements, the SMO Framework 360 may interact with a cloud computing platform (such as an open cloud (O-Cloud) platform 390) to perform network element life cycle management (such as to instantiate virtualized network elements) via a cloud computing platform interface, such as an O2 interface. A virtualized network element may include, but is not limited to, a CU 310, a DU 330, an RU 340, a non-RT RIC 350, and/or a Near-RT RIC 370. In some aspects, the SMO Framework 360 may communicate with a hardware aspect of a 4G RAN, a 5G NR RAN, and/or a 6G RAN, such as an open eNB (O-eNB) 380, via an O1 interface. Additionally or alternatively, the SMO Framework 360 may communicate directly with each of one or more RUs 340 via a respective O1 interface. In some deployments, this configuration can enable each DU 330 and the CU 310 to be implemented in a cloud-based RAN architecture, such as a vRAN architecture.

The Non-RT RIC 350 may include or may implement a logical function that enables non-real-time control and optimization of RAN elements and resources, artificial intelligence and/or machine learning (AI/ML) workflows including model training and updates, and/or policy-based guidance of applications and/or features in the Near-RT RIC 370. The Non-RT RIC 350 may be coupled to or may communicate with (such as via an A1 interface) the Near-RT RIC 370. The Near-RT RIC 370 may include or may implement a logical function that enables near-real-time control and optimization of RAN elements and resources via data collection and actions via an interface (such as via an E2 interface) connecting one or more CUs 310, one or more DUs 330, and/or an O-eNB with the Near-RT RIC 370.

In some aspects, to generate AI/ML models to be deployed in the Near-RT RIC 370, the Non-RT RIC 350 may receive parameters or external enrichment information from external servers. Such information may be utilized by the Near-RT RIC 370 and may be received at the SMO Framework 360 or the Non-RT RIC 350 from non-network data sources or from network functions. In some examples, the Non-RT RIC 350 or the Near-RT RIC 370 may tune RAN behavior or performance. For example, the Non-RT RIC 350 may monitor long-term trends and patterns for performance and may employ AI/ML models to perform corrective actions via the SMO Framework 360 (such as reconfiguration via an O1 interface) or via creation of RAN management policies (such as A1 interface policies).

The network node 110, the controller/processor 240 of the network node 110, the UE 120, the controller/processor 280 of the UE 120, the CU 310, the DU 330, the RU 340, or any other component(s) of FIG. 1, 2, or 3 may implement one or more techniques or perform one or more operations associated with changing an SnMF in association with a UE handover, as described in more detail elsewhere herein. For example, the controller/processor 240 of the network node 110, the controller/processor 280 of the UE 120, any other component(s) of FIG. 2, the CU 310, the DU 330, or the RU 340 may perform or direct operations of, for example, process 1100 of FIG. 11, process 1200 of FIG. 12, process 1300 of FIG. 13, or other processes as described herein (alone or in conjunction with one or more other processors). The memory 242 may store data and program codes for the network node 110, the network node 110, the CU 310, the DU 330, or the RU 340. The memory 282 may store data and program codes for the UE 120. In some examples, the memory 242 or the memory 282 may include a non-transitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 110, the UE 120, the CU 310, the DU 330, or the RU 340, may cause the one or more processors to perform process 1100 of FIG. 11, process 1200 of FIG. 12, process 1300 of FIG. 13, or other processes as described herein. In some examples, executing instructions may include running the instructions, converting the instructions, compiling the instructions, and/or interpreting the instructions, among other examples.

In some aspects, a first network node (e.g., the network node 110) includes means for receiving a first message from an SU, the first message comprising a first SU association request associated with a handover of the SU from a first SnMF service area to a second SnMF service area, wherein the first SnMF service area is associated with a first SnMF node and the second SnMF service area is associated with a second SnMF node; and/or means for transmitting a second message to the SU, the second message indicating an SU association acceptance and a first routing ID associated with the second SnMF node.

In some aspects, a first network node (e.g., the network node 110) includes means for receiving an indication of a first SU association request associated with a handover of an SU from a first SnMF service area to a second SnMF service area, wherein the first SnMF service area is associated with a first SnMF node and the second SnMF service area is associated with a second SnMF node; and/or means for transmitting an indication of an SU association acceptance and a first routing ID associated with the second SnMF node.

In some aspects, a first network node (e.g., the network node 110) includes means for receiving an indication of a first SU association request; and/or means for transmitting an indication of an SU association rejection in association with a handover of an SU from a first SnMF service area to a second SnMF service area, wherein the first SnMF service area is associated with a first SnMF node and the second SnMF service area is associated with a second SnMF node, the first network node comprising the first SnMF, wherein the indication of the SU association rejection comprises a first routing ID associated with the second SnMF node. The means for the first network node to perform operations described herein may include, for example, one or more of communication manager 150, transmit processor 214, TX MIMO processor 216, modem 232, antenna 234, MIMO detector 236, receive processor 238, controller/processor 240, memory 242, or scheduler 246.

Figure 4A:
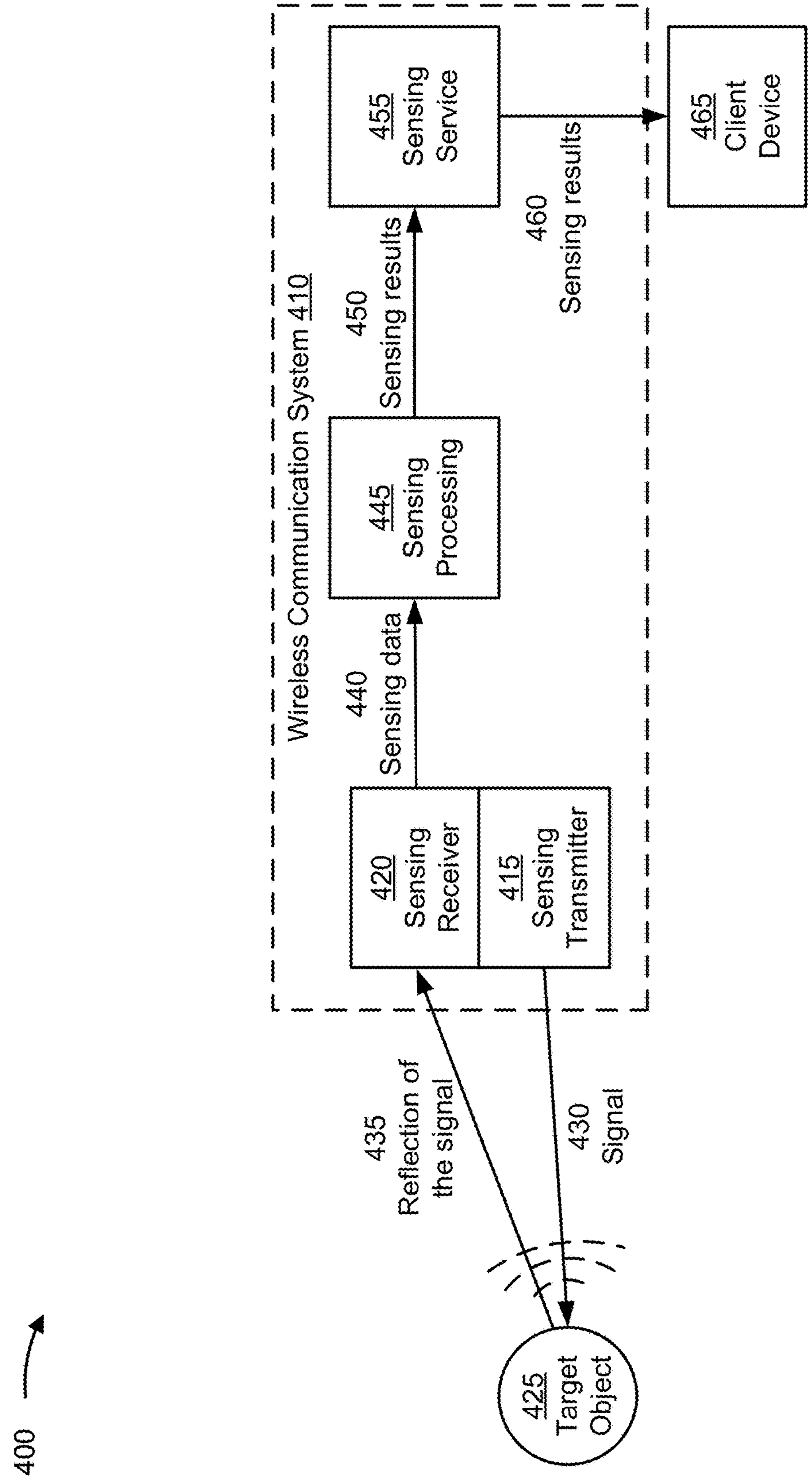
FIGS. 4A and 4B are diagrams illustrating examples of radio frequency (RF) sensing in accordance with the present disclosure.
Figure 4B:
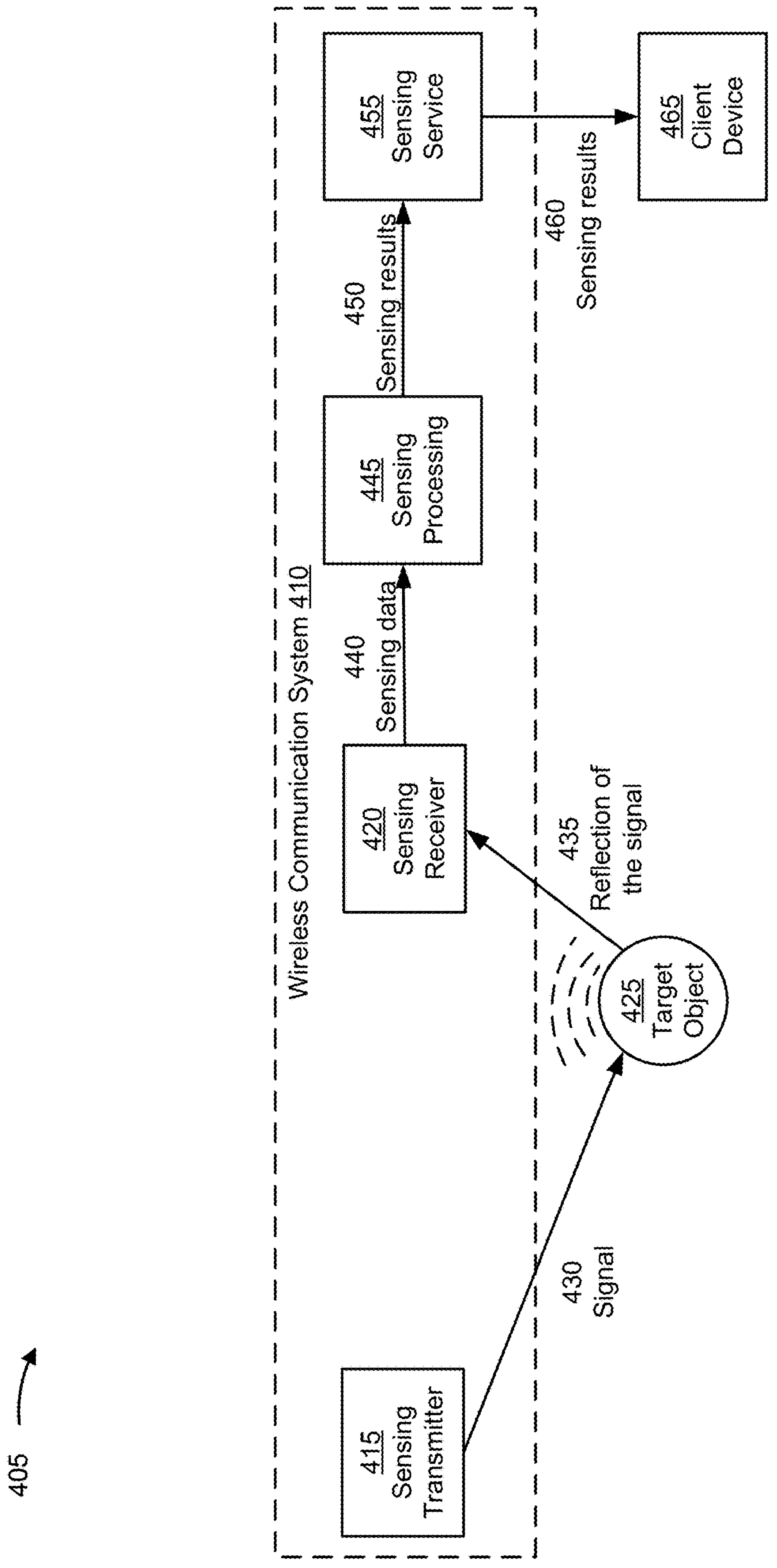

FIGS. 4A and 4B are diagrams illustrating examples of RF sensing in accordance with the present disclosure. Wireless communication signals (for example, RF signals configured to carry OFDM symbols) transmitted between a UE 120 and a network node 110 can be reused for RF sensing. Using wireless communication signals for RF sensing can be considered consumer-level radar with advanced detection capabilities that enable, among other things, touchless/device-free interaction with a device/system. "RF sensing" may be a radar operation performed by a wireless communication device, such as a UE, a network entity, or another device (such as a wireless local area network (WLAN) access point), using wireless communication signals.

RF sensing may also be referred to as environment sensing, radar sensing, WLAN sensing, Wi-Fi sensing, and/or wireless sensing, among other examples. The wireless communication signals used to perform RF sensing may be cellular communication signals (for example, LTE signals, NR signals, and/or 6G signals) or WLAN signals (for example, Wi-Fi signals), among other examples. As an example, the wireless communication signals may be an OFDM waveform as utilized in the wireless communication network 100. High-frequency communication signals, such as millimeter wave signals, may be beneficial to use as RF sensing signals because the higher frequency provides a more accurate range (for example, distance) detection and/or motion detection. As another example, WLAN signals (for example, WLAN or Wi-Fi signals that would otherwise be used for wireless communication) may be used to perform RF sensing (for example, to conserve power relative to using a higher frequency range signal). In such examples, the RF sensing may be referred to as WLAN sensing or Wi-Fi sensing.

RF sensing may be performed using various frequency bands or frequency ranges, such as the millimeter wave band or the sub-6 GHz band, among other examples. In some examples, different frequencies may be used sequentially (for example, first using a sub-6 GHz frequency and second using a millimeter wave frequency) by a wireless communication device performing the RF sensing to vary a resolution (for example, from coarse to fine), vary a detection range (for example, from large to narrow), and/or vary power consumption (for example, from low to high), among other examples.

As shown in FIGS. 4A and 4B, one or more SUs may detect and/or monitor a target object by transmitting and/or measuring wireless communication signals. FIG. 4A depicts an example of monostatic sensing 400. For example, the one or more SUs may be included in a wireless communication system 410, such as the wireless communication network 100. A sensing transmitter 415 and a sensing receiver 420 may communicate RF signals (for example, wireless communication signals) to perform RF sensing. In some examples, the sensing transmitter 415 and the sensing receiver 420 may be co-located, such as in a single SU (for example, as depicted in FIG. 4A). Examples where the sensing transmitter 415 and the sensing receiver 420 are co-located may be referred to as "monostatic sensing." FIG. 4B depicts an example of bistatic sensing 405. For example, the sensing transmitter 415 and the sensing receiver 420 may not be co-located (for example, as depicted in FIG. 4B). For example, the sensing transmitter 415 and the sensing receiver 420 may be included in separate devices, such as in separate SUs. Examples where the sensing transmitter 415 and the sensing receiver 420 are not co-located (for example, are included in different entities) may be referred to as "bistatic sensing." In some examples, RF sensing may be associated with obtaining sensor data that is indicative of a characteristic of a target object 425. In other examples, an RF sensing operation may include multiple sensing transmitters 415 and/or multiple sensing receivers 420 (for example, referred to as "multistatic sensing").

As shown in FIGS. 4A and 4B, the sensing transmitter 415 may transmit one or more signals 430. The one or more signals 430 may be RF signals, wireless communication signals, OFDM signals, and/or sensing reference signals, among other examples. The one or more signals may reflect off of the target object 425, resulting in a reflection 435 of the signal 430. The reflection 435 may be a reflection of a signal 430, a refraction of the signal 430, a diffraction of the signal 430, and/or a deflected version of the signal 430, among other examples. The sensing receiver 420 may receive and/or detect the reflection 435. The sensing receiver 420 may perform one or more measurements of the reflection 435 to obtain sensing data 440. The sensing data 440 may include information that is indicative of one or more characteristics of the target object 425. For example, the sensing data 440 may include a signal strength (for example, an RSRP), a received raw signal sample, a channel delay profile, one or more Doppler measurements (for example, Doppler per channel tap), CSI, CQI, time delay measurements, and/or an angle of arrival (AoA) (for example, AoA per channel tap), among other examples.

As shown in FIGS. 4A and 4B, sensing processing 445 may be performed using the sensing data 440 to obtain sensing results 450. In some examples, an SU (for example, that includes the sensing receiver 420) may perform the sensing processing 445. In such examples, the SU may transmit, to a network node 110, the sensing results 450. In other examples, another device, such as a network node 110, may perform the sensing processing 445. In such examples, an SU (for example, that includes the sensing receiver 420) may transmit, and the network node 110 may receive, the sensing data 440. The sensing results 450 may include information for one or more characteristics of the target object 425. For example, the sensing results 450 may include positioning information, velocity information, a sensing resolution, object detection information, and/or other information that is determined using the sending data 440. The sensing results 450 may be provided to a sensing service 455 of the wireless communication system 410. The sensing service 455 may include one or more core network nodes or entities, such as one or more network nodes 170.

For example, the sensing service 455 may include an SnMF entity, as described in more detail elsewhere herein. The sensing service 455 may provide, to a client device 465, sensing results 460. The sensing results 460 may be the sensing results 450 or may be based on the sensing results 450. The client device 465 may be a server device or an application executing on a device. For example, the client device 465 may provide, to the sensing service 455, a sensing request. The sensing service 455 may configure, manage, and/or otherwise maintain a sensing operation (for example, in a similar manner as described herein) for fulfilling the sensing request.

Possible use cases of RF sensing include health monitoring (such as heartbeat detection, and/or respiration rate monitoring, among other examples), gesture recognition (such as human activity recognition, keystroke detection, and/or sign language recognition, among other examples), contextual information acquisition (such as location detection/tracking, direction finding, and/or range estimation, among other examples), and/or automotive radar (such as smart cruise control and/or collision avoidance), among other examples.

Similar to conventional radar (for example, frequency modulation continuous waveform (FMCW) radar), a signal 430 can be used to estimate the range (for example, distance), velocity (for example, Doppler spread), and/or angle (for example, AoA) of the target object 425. Unlike conventional radar, RF sensing may use a PHY layer for both RF sensing measurements and wireless communication. Signals 430 may be transmitted in a beam (for example, using beamforming) and may reflect off nearby objects within the beam. A portion of the transmitted RF signals is reflected back toward a sensing receiver 420, which is the reflection 435 (for example, via the reflections of the transmitted signals).

In some examples, an OFDM waveform can be used for both wireless communication (for example, over a wireless network) and RF sensing. To use an OFDM waveform as a signal for RF sensing, specific reference signals, which may be referred to herein as sensing reference signals, may be needed. The RF sensing performance (for example, resolution and maximum values of range, velocity, and/or angle) may depend on the sensing reference signal design. For example, for a gesture recognition use case, coarse range/velocity estimation may be sufficient for the RF sensing. That is, it may be sufficient for a wireless communication device to be able to detect a pattern of movement relative to the current position of the target object 425 (for example, a user's hand or head). In such examples, a low density (for example, sparse) sensing reference signal with a short wavelength and narrow bandwidth may be sufficient to provide the necessary range and velocity resolution. For a vibration detection use case, such as for respiration monitoring, accurate Doppler estimation may be important, whereas accurate range estimation may not be as important. In such examples, a high-density sensing reference signal with a long duration in the time domain may be beneficial. For a location detection use case, such as for object detection, accurate range estimation may be important, whereas accurate Doppler estimation may not be as important. In such examples, a high-density wideband sensing reference signal in the frequency domain may be beneficial. Therefore, a network entity may configure one or more sensing reference signals depending on a use case of the RF sensing to improve the RF sensing performance. In some examples, a sensing reference signal may be a sounding reference signal (SRS), a wireless communication reference signal, or a WLAN signal, among other examples.

Figure 5:
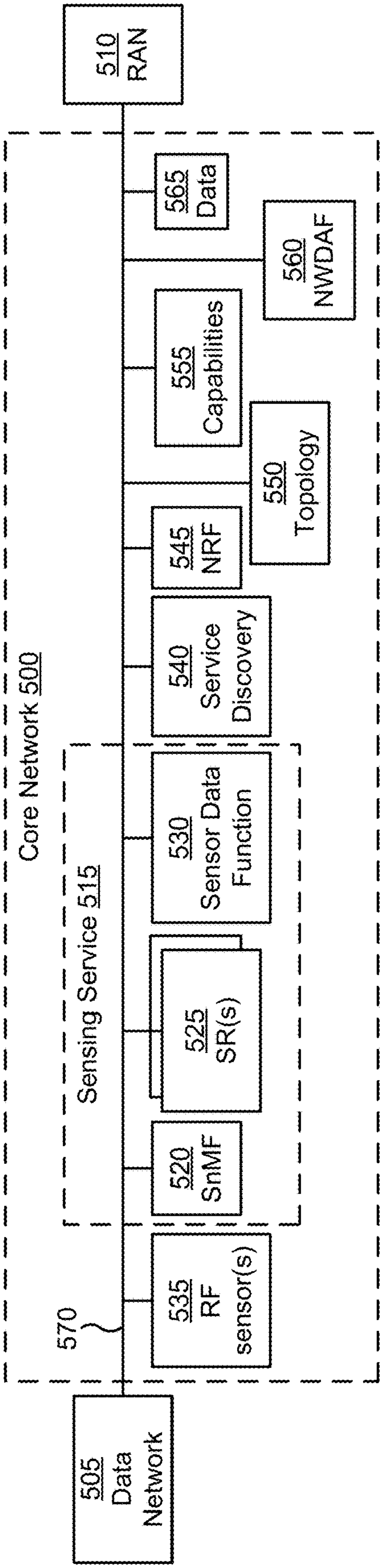
FIG. 5 is an example of a core network configured to provide sensing services in accordance with the present disclosure.

FIG. 5 is an example of a core network 500 configured to provide sensing services in accordance with the present disclosure. The core network 500 may enable communication via a data network 505 and a RAN 510. The core network 500 may be a 5G core network, a 6G core network, a next generation (NG) core network, or another type of core network. The RAN 510 may be the wireless communication network 100. The data network 505 may include one or more wired and/or wireless data networks. For example, the data network 505 may include an IP Multimedia Subsystem (IMS), a public land mobile network (PLMN), a local area network (LAN), a wide area network (WAN), a metropolitan area network (MAN), a private network (such as a corporate intranet), an ad hoc network, the Internet, a fiber-optic-based network, a cloud computing network, a third party services network, an operator services network, and/or a combination of these or other types of networks.

The core network 500 may include an example functional architecture in which systems and/or methods described herein may be implemented. As shown in FIG. 5, the core network 500 may include one or more functional elements (for example, one or more functions or entities) configured to provide a sensing service 515 (for example, an RF sensing service or an ISAC service). For example, the core network 505 may include an SnMF entity 520. The SnMF entity 520 may be configured to perform discovery of SUs, configuration of SUs, collection of sensing data from one or more SUs, processing of sensing data, and/or exposure of sensing results, among other examples. The core network 500 may include one or more sensing repositories (SRs) 525. An SR 525 may be a repository that is configured to store information for one or more SUs, such as SU locations, and/or SU capabilities, among other examples. In some examples, the one or more SRs 525 may include a UE sensing repository that is configured to store information for UEs (for example, configured to operate in the RAN 510) that are capable of operating as an SU. Additionally, the one or more SRs 525 may include a TRP sensing repository that is configured to store information for TRPs and/or network nodes (for example, configured to operate in the RAN 510) that are capable of operating as an SU. In some examples, an SR 525 may include information for both UEs and TRPs that are capable of operating as an SU. In some examples, the one or more SRs 525 may be dedicated services within the SnMF 520. In other examples, the one or more SRs 525 may be part of another network function, such as an AMF or mobility service or a network repository function (NRF) 545. In other examples, the SR 525 may be a standalone network function. The core network 500 may include a sensor data function 530. The sensor data function 530 may be configured to perform processing of sensor data (for example, collected via one or more SUs in the RAN 510) to produce sensing results, as described in more detail elsewhere herein.

The core network 500 may include one or more RF sensors 535 configured to obtain sensor data. The one or more RFs sensors 535 may include a camera, a LiDAR sensor, a radar sensor, a sonar sensor, and/or a Wi-Fi sensor, among other examples. The one or more RF sensors 535 may be referred to as non-3GPP sensors. The core network 500 may include a service discovery function 540. The service discovery function 540 may be configured to store information for one or more services supported by the core network 500 and/or the RAN 510. In some examples, the service discovery function 540 may be configured to provide an indication (for example, to one or more devices in the RAN 510, such as one or more network nodes 110) of the one or more services supported by the core network 500, such as the sensing service described herein. For example, the service discovery function 540 may include one or more devices that support exposure of capabilities and/or events in the wireless telecommunications system to help other entities in the wireless telecommunications system discover network services. The service discovery function 540 may also be referred to as a network exposure function (NEF).

The core network 500 may include an NRF 545. The NRF 545 may be configured as a centralized repository for one or more network functions supported by the core network 500 and/or the RAN 510. For example, other functional elements of the core network 500 may access the NRF 545 to obtain information for a function or service provided by the core network 500, such as the sensing service described herein. The core network 500 may include a topology entity 550. The topology entity 550 may be configured to store and/or manage information for a network topology, such as a topology of the RAN 510. The core network 500 may include a capabilities entity 555. The capabilities entity 555 may store information indicating capabilities of respective nodes or devices (for example, in the RAN 510). The core network 500 may include a network data analytics function (NWDAF) 560. The NWDAF 560 may include one or more devices that gather information associated with UEs 120, SUs, and/or the RAN 510. The NWDAF 560 may calculate analytics based on the gathered information. Different portions of the core network 500 may subscribe to receive analytic updates from the NWDAF 560. In some examples, the sensor data function 530 may be a component of the NWDAF 560. The core network 500 may include a data function entity 565. The data function entity 565 may be configured to determine, obtain, and/or provide data for the RAN 510.

The core network 500 may include other functional elements that are not depicted in FIG. 5, such as a network slice selection function (NSSF), a network exposure function (NEF), an authentication server function (AUSF), a unified data management (UDM) component, a policy control function (PCF), an application function (AF), an access and mobility management function (AMF), a mobility service, a session management function (SMF), and/or a user plane function (UPF), among other examples. As shown in FIG. 5, functional elements of the core network 500 may communicate via a message bus 570. The message bus 570 may be a logical and/or physical communication structure for communication among the functional elements. Accordingly, the message bus 570 may permit communication between two or more functional elements, whether logically (for example, using one or more application programming interfaces (APIs), among other examples) and/or physically (for example, using one or more wired and/or wireless connections).

Figure 6:
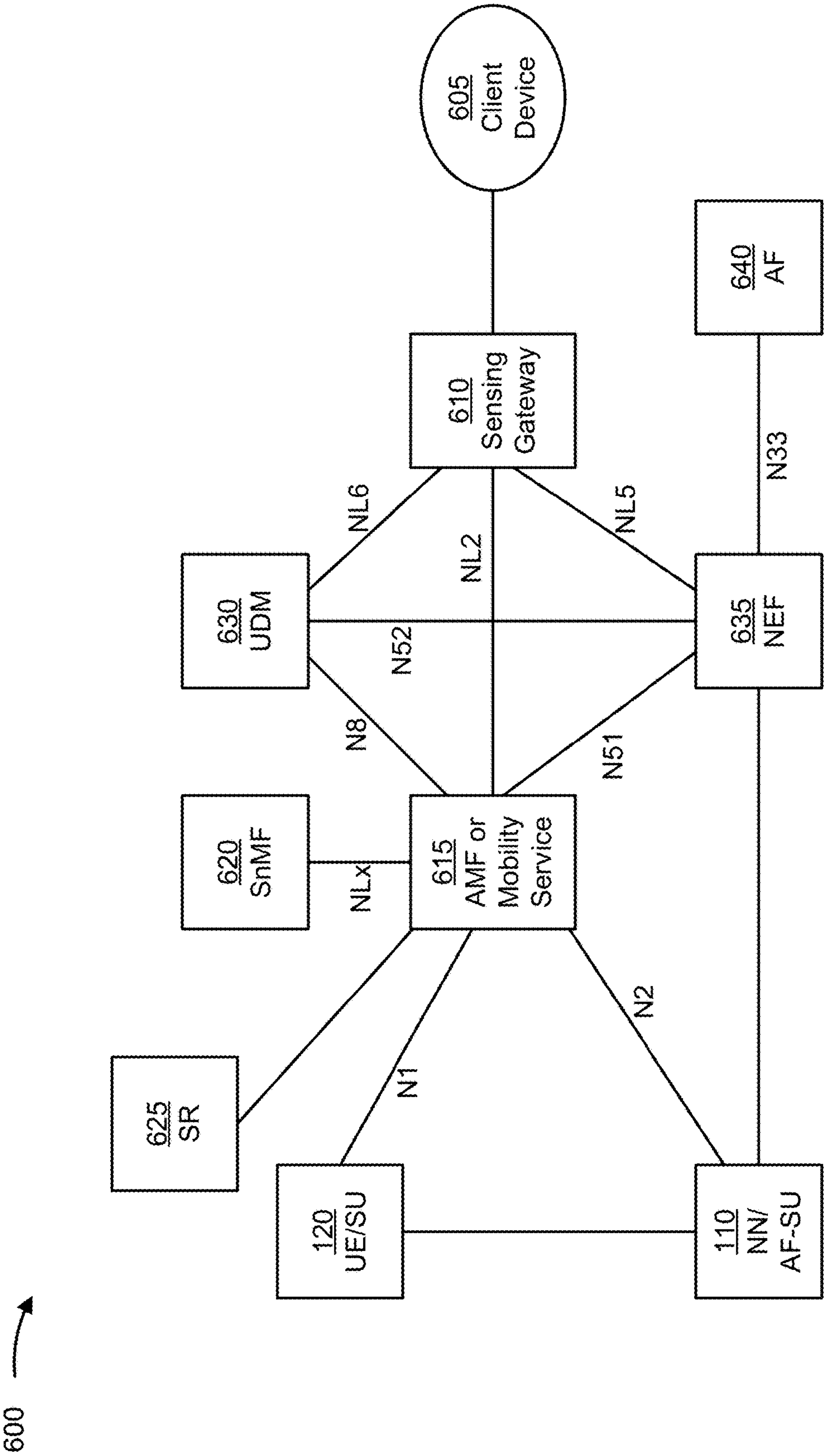
FIG. 6 is an example of a control plane architecture for a sensing service in accordance with the present disclosure.

FIG. 6 is an example of a control plane architecture 600 for a sensing service in accordance with the present disclosure. As shown in FIG. 6, the control plane architecture 600 may include a client device 605. The client device 605 may be a location service (LCS) client or a sensing service client. The client device 605 may provide a sensing request associated with the sensing service.

The control plane architecture 600 may include a sensing gateway 610. The sensing gateway 610 may be configured as a gateway between the client device 605 and a core network, such as the core network 500. The sensing gateway 610 may enable one or more network functions, such as traffic routing, policy enforcement, charging, quality of service (QOS) management, and/or security, among other examples. For example, the sensing gateway 610 may route a sensing request from the client device 605 to an AMF or mobility service 615 and/or to an SnMF 620. In other examples, the AMF or mobility service 615 may route the sensing request to an appropriate SnMF 620. The sensing gateway 610 and the AMF or mobility service 615 may communicate via an interface (shown as an NL2 interface). The AMF or mobility service 615 may communicate with one or more SnMFs 620. For example, the AMF or mobility service 615 and an SnMF 620 may communicate via an interface, such as an NLx interface (for example, as defined, or otherwise fixed, by a wireless communication standard, such as the 3GPP). An SnMF may be configured to operate as a trusted application service provider (ASP) entity for provisioning non-3GPP-RF sensors (shown in FIG. 6).

The control plane architecture 600 may include one or more SRs 625. As described elsewhere herein, an SR 625 may be a logical control function configured to store the identity, location, and/or capabilities of available SUs within a wireless communication network. An SR 625 may provide an indication (for example, may expose) the available SUs to one or more SnMFs 620. In some examples, the functionality of an SR may be performed by another network function, such as the AMF or mobility service 615, an NRF (not shown in FIG. 6), and/or the SnMF 620. The control plane architecture 600 may include a UDM 630. The UDM 630 may include one or more devices that store user data and profiles in the wireless telecommunications system. In some aspects, the UDM 630 may be used for fixed access and/or mobile access, among other examples, in the core network.

The control plane architecture may include one or more UEs 120 and/or one or more network nodes 110. As described elsewhere herein, a UE 120 may be configured to operate as an SU for a sensing service (for example, by the SnMF 620, the AMF or mobility service 615, and/or a network node 110). Additionally, a network node 110 may be configured to operate as an SU (for example, an application function (AF) SU) for a sensing service (for example, by the SnMF 620, the AMF or mobility service 615, and/or another network node 110). The control plane architecture may include an NEF 635 that communicates with one or more AFs 640. An AF 640 may be an RF sensor, such as a camera, a LiDAR sensor, a radar sensor, a sonar sensor, a Wi-Fi sensor, or another non-3GPP RF sensor.

Figure 7:
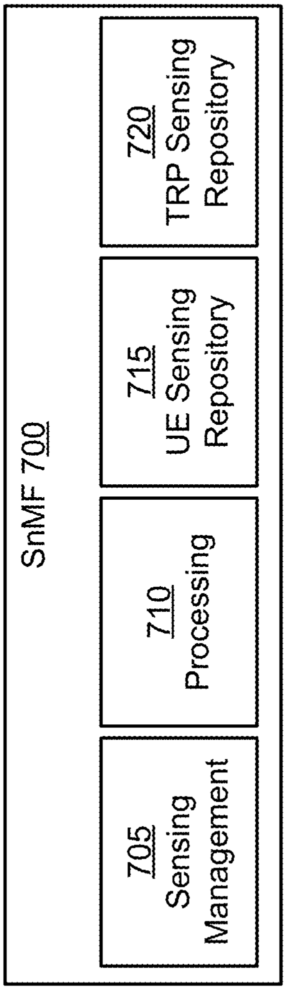
FIG. 7 is an example of a sensing service and management function (SnMF) entity for a sensing service, in accordance with the present disclosure.

FIG. 7 is an example of an SnMF entity 700 for a sensing service, in accordance with the present disclosure. The SnMF entity 700 may include one or more functional components configured to perform operations for a sensing service, as described herein. For example, the SnMF entity 700 may be configured to perform discovery and/or configuration of SUs, collection of sensing data, processing of sensing data, and/or exposure of sensing results, among other examples. The SnMF entity 700 may include a sensing management component 705, a processing component 710, a UE sensing repository 715, and/or a TRP sensing repository 720, among other examples.

The sensing management component 705 may be configured to perform one or more operations for the discovery and/or configuration of SUs, as described in more detail elsewhere herein. The processing component 710 may be configured to generate or determine sensing results based on, in response to, or otherwise associated with collected sensor data (for example, collected from one or more SUs). The processing component 710 may be physically executed at different (distributed) locations depending on a computing architecture of the SnMF entity 700. The UE sensing repository 715 may store information for one or more UEs that are configured to operate as an SU, such as an identify of the UEs, a location of the UEs, and/or one or more capabilities of the UEs, among other examples. The TRP repository 720 may store information for one or more TRPs that are configured to operate as an SU, such as an identify of the TRPs, a location of the TRPs, and/or one or more capabilities of the TRPs, among other examples. The UE sensing repository 715 and/or the TRP repository 720 may be a dedicated service within the SnMF entity 700. Alternatively, the UE sensing repository 715 and/or the TRP repository 720 may be included in another network function, such as an AMF or mobility service or an NRF. In some examples, the SnMF entity 700 may include an SR that stores information for one or more TRPs and one or more UEs that are configured to operate as an SU.

In some examples, a wireless communication network may be associated with a single SnMF entity 700 for each PLMN. In such examples, the SnMF entity 700 may be configured as the single entry and exit point for the sensing service. In such examples, there may be a single logical SnMF entity 700 that may be implemented via multiple (distributed) SnMF instances. In other examples, multiple SnMF entities 700 may be defined and/or may be accessible. For example, SnMF entities 700 may be defined for respective service areas and/or respective service types. For example, a given SnMF entity 700 may be associated with a supported service area (for example, a geographical area over which the SnMF is managing a sensing service), one or more supported service types, one or more supported QoS parameters for each supported service type, and/or one or more other capabilities. In some examples, one or more SnMF functionalities may be common across multiple SnMF entities 700. For example, one or more SRs may be accessed by multiple SnMF entities 700.

While an SU (e.g., a UE or other network node configured as an SU) is connected to a serving cell, the SU may be configured to perform sensing tasks, sometimes in conjunction with a TRP. In some cases, the SU may also move from the serving cell (e.g., a source cell) to another cell (e.g., a target cell), which becomes a new serving cell. In some cases, the existing sensing configuration becomes irrelevant when the SU leaves the source cell, and once connected to the target cell, the SU is configured with a new sensing configuration associated with the target cell, thereby resulting in a gap in the sensing tasks being performed by the SU. Moreover, in some cases, movement of an SU from a source cell to a target cell may result in a change in service area and, thus, a change from an area associated with a first SnMF network node to an area associated with a second SnMF network node.

Various aspects relate generally to SU handover and associated changes in configuration for a sensing service. Some aspects more specifically relate to changing an SnMF in association with a handover of a UE configured as a sensing unit (SU) for an integrated sensing and communication (ISAC) service. In some aspects, as the UE (referred to herein, interchangeably, as an "SU") is handed over to the target cell, a target RAN node, or a mobility service, may request, of the SnMF, a new configuration associated with the target cell. The target SnMF may contact the source SnMF to receive the necessary context to configure the target RAN node and/or the UE. The mobility service may forward the handover request to the selected target RAN node, which may provide a handover indication to the source SnMF. The source SnMF may provide information to the target RAN node that may be used by the target RAN node to configure itself and/or the UE for continuing the sensing operations in association with a target cell provided by the target RAN node. However, if the mobility service is unable to route the request to the target SnMF, then the SnMF that receives the association request may reject the request and provide in its response the target SnMF address information. The UE may then initiate another association request associated with the provided target SnMF address.

In some aspects, a sensing repository (SR) function network node (sometimes referred to as a common UE repository) may be configured to maintain information about sensing UEs. Multiple SnMF network nodes may register with the SR network node. The SR network node may be configured to notify an SnMF network node if a UE is entering or leaving a service area associated with the SnMF network node. In some aspects, a mobility service that serves the UE may notify the SR network node when the mobility service receives an association request from the UE. For example, the mobility service may route the association request, including an indication of a location of the UE, to the SR, which may identify, based on the location of the UE, a target SnMF. The SR may notify the target SnMF that the UE is entering a service area associated with the target SnMF, thereby associating the UE with the target SnMF. The target SnMF may then configure the UE for sensing in the new SnMF service area. The SR also may notify the source SnMF of the change of service area of the UE.

In some aspects, areas that are being sensed may change over time. A change in an area to be sensed may result in a change in an SnMF associated with the sensing service. For example, in some aspects, a source SnMF and/or a target SnMF may determine that a new area is to be sensed and, as a result, may determine that a change in serving SnMF is needed. In some aspects, as a sensing area changes, UEs to be configured for sensing may be changed. For example, in some aspects, a source SnMF may determine that a first UE is no longer to be configured for sensing and/or that a second UE (which was not previously configured for sensing) is to be configured for sensing.

In some examples, the described techniques can be used to ensure that handovers in which a UE moves from a source cell to a target cell associated with a new SnMF are performed while minimizing interruptions to a sensing session. For example, by providing target SnMF address information to a mobility service with a rejection of an association request, the described techniques can be used to facilitate a change in a serving SnMF resulting from a UE handover from a source cell to a target cell, thereby reducing interruptions to a sensing service as a result of the UE handover. In some aspects, by configuring an SR to maintain information about sensing UEs and registered SnMFs, the described techniques can be used to reduce signaling overhead, processing overhead, and/or latency associated with a target RAN node in preparing for a handover of a UE to the target cell, in which a sensing session is to be continued. For example, by configuring an SR network node to notify a target SnMF of a change in service area, the described techniques may enable a target SnMF to prepare for the UE handover, thereby mitigating interruptions to a sensing service due to UE handovers that result in changes in sensing service areas. In some aspects, by configuring SnMF network nodes to determine that a new area is to be sensed, the described techniques may enable changes in SnMF associations and/or configurations of UEs for sensing while minimizing interruptions to the sensing service.

Figure 8:
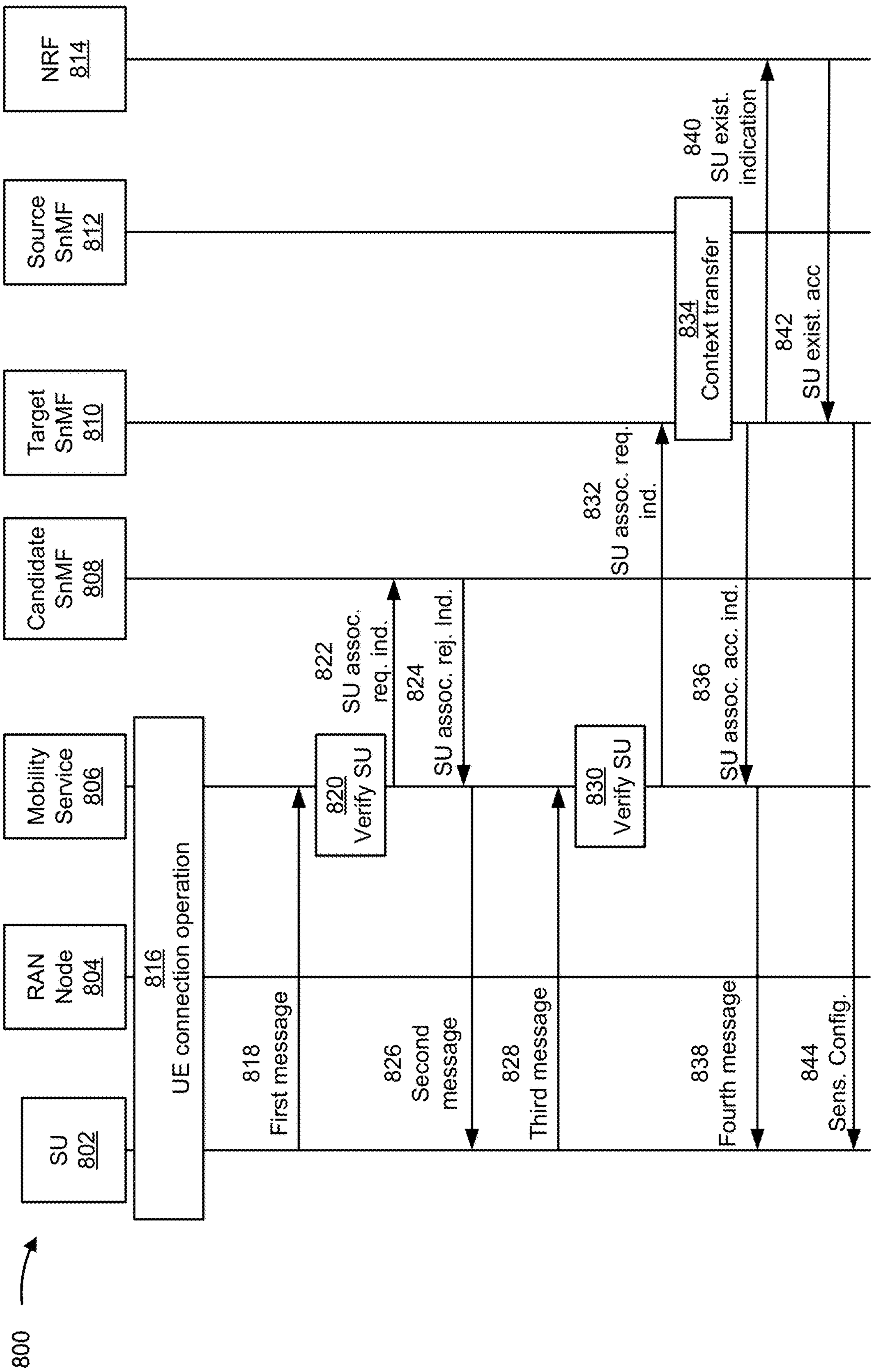
FIG. 8 is a diagram illustrating example operations associated with changing an SnMF in association with a handover of a sensing unit (SU) in accordance with the present disclosure.

FIG. 8 is a diagram illustrating example operations 800 associated with changing an SnMF in association with a handover of an SU in accordance with the present disclosure. In the example operations 800, a common sensing repository may not be implemented. As shown in FIG. 8, an SU 802, a RAN node 804, a mobility service 806, a candidate SnMF 808, a target SnMF 810, a source SnMF 812, and a network repository function (NRF) 814 may communicate with each other. The SU 802, the RAN node 804, the mobility service 806, the candidate SnMF 808, the target SnMF 810, the source SnMF 812, and the NRF 814 may communicate via one or more network interfaces. The one or more network interfaces may include wired connections, wireless connections, and/or logical connections. For example, the mobility service 806, the candidate SnMF 808, the target SnMF 810, the source SnMF 812, and the NRF 814 may be network functions of a core network for a wireless communication network, such as the wireless communication network 100 (for example, as described in more detail elsewhere herein). In some examples, the SU 802 may be, be similar to, include, or be included in, the UE 120 depicted in FIGS. 1-3. In some examples, any one or more of the RAN node 804, the mobility service 806, the candidate SnMF 808, the target SnMF 810, the source SnMF 812, and the NRF 814 may be, be similar to, include, or be included in, the network node 110 depicted in FIGS. 1 and 2, and/or one or more components of the disaggregated base station architecture 300 depicted in FIG. 3.

In some examples, the candidate SnMF 808, the target SnMF 810, and/or the source SnMF may be standalone network functions. In some other examples, one or more of the candidate SnMF 808, the target SnMF 810, and/or the source SnMF may be included in another network function, such as a service discovery function, an AMF or mobility service, a gateway (for example, a sensing gateway), or another network function. In some aspects, the candidate SnMF 808, the target SnMF 810, and/or the source SnMF may be referred to as gateways or sensing gateways. For example, the candidate SnMF 808, the target SnMF 810, and/or the source SnMF may be logical functions configured to select an SnMF node to be associated with a sensing request (for example, configured to select an SnMF node to serve a sensing request).

As the SU 802 is handed over to a target cell, the target RAN node (shown in FIG. 8 as "RAN node") 804 or the mobility service 806 may request the needed configuration from the SnMF associated with the target cell, indicating the sensing session ID(s) and the current serving SnMF (referred to herein as "source SnMF"). The target SnMF 810 may contact the source SnMF 812 to receive the necessary context to configure the RAN node 804 and/or the SU 802. In some aspects, the context may also include information for the target SnMF 810 to expose the results (e.g., to indicate the need to change the reporting link to a new gateway or SU). If the mobility service 806 first requests the configuration from a candidate SnMF 808 and is unable to route the request to the candidate SnMF 808, then the candidate SnMF 808 can reject the request and provide in its response the target SnMF 810 address information in the routing ID. The SU 802 may then initiate another association request with the provided target SnMF 810 address.

In an operation 816, the SU 802, the RAN node 804, and the mobility service 806 may perform a UE connection operation to connect the SU 802 to a network provided by the RAN node 804. In an operation 818, the SU 802 may transmit, and the mobility service 806 may receive, a first message. The first message may include, for example, a network access stratum (NAS) message. The first message may include a first SU association request associated with a handover of the SU 802 from a first SnMF service area to a second SnMF service area. For example, the first SnMF service area may be associated with the source SnMF 812 and the second SnMF service area may be associated with the candidate SnMF 808 and/or the target SnMF 810. In some aspects, the first message may include, for example, a routing ID associated with the source SnMF 812.

In an operation 820, the mobility service 806 may verify the SU 802 and, in an operation 822, the mobility service 806 may transmit, to the candidate SnMF 808, an indication of the SU association request (shown in FIG. 8 as "SU assoc. req. ind."). Due to the candidate SnMF being unable to support the SU association request (e.g., as a result of a configuration of the candidate SnMF 808 and/or a location of the SnMF 808, among other examples), in an operation 824, the candidate SnMF 808 may transmit, and the mobility service 806 may receive, an indication of an SU association rejection (shown in FIG. 8 as "SU assoc.rej.ind."). The indication of the SU association rejection may include an indication of a routing ID associated with the target SnMF 810.

In an operation 826, the mobility service 806 may transmit, and the SU 802 may receive, a second message. The second message may indicate the SU association rejection and the routing ID associated with the target SnMF 810. In some aspects, the second message may include an NAS message. In an operation 828, the SU 802 may transmit, and the mobility service 806 may receive, a third message. The third message may include an SU association request associated with the target SnMF 810. In some aspects, the third message may indicate the routing ID associated with the target SnMF 810. In some aspects, the third message may include an NAS message.

In an operation 830, the mobility service 806 may verify the SU 802 and, in an operation 832, the mobility service 806 may transmit, and the target SnMF 810 may receive, an indication of the SU association request. In an operation 834, the target SnMF 810 may obtain SU context associated with the SU 802 (shown as "context transfer"). In an operation 836, the target SnMF 810 may transmit, and the mobility service 806 may receive, an indication of an SU association acceptance associated with the SU association request. In an operation 838, the mobility service 806 may transmit, and the SU 802 may receive, a fourth message. The fourth message may indicate the SU association acceptance and may include a routing ID associated with the target SnMF 810.

In some aspects, in an operation 840, the target SnMF 810 may provide, and the NRF 814 may obtain, an indication of an existence of the SU 802. For example, the indication of the existence of the SU 802 may indicate the association of the SU with the target SnMF 810. In an operation 842, the NRF 814 may provide, and the target SnMF 810 may obtain, an acceptance (e.g., an acknowledgement) of the indication of the existence of the SU 802. In an operation 844, the target SnMF 810 may transmit, and the SU 802 may receive, a sensing configuration. The sensing configuration may configure the SU 802 for continuing a sensing session in the SnMF service area associated with the target SnMF 810.

Figure 9:
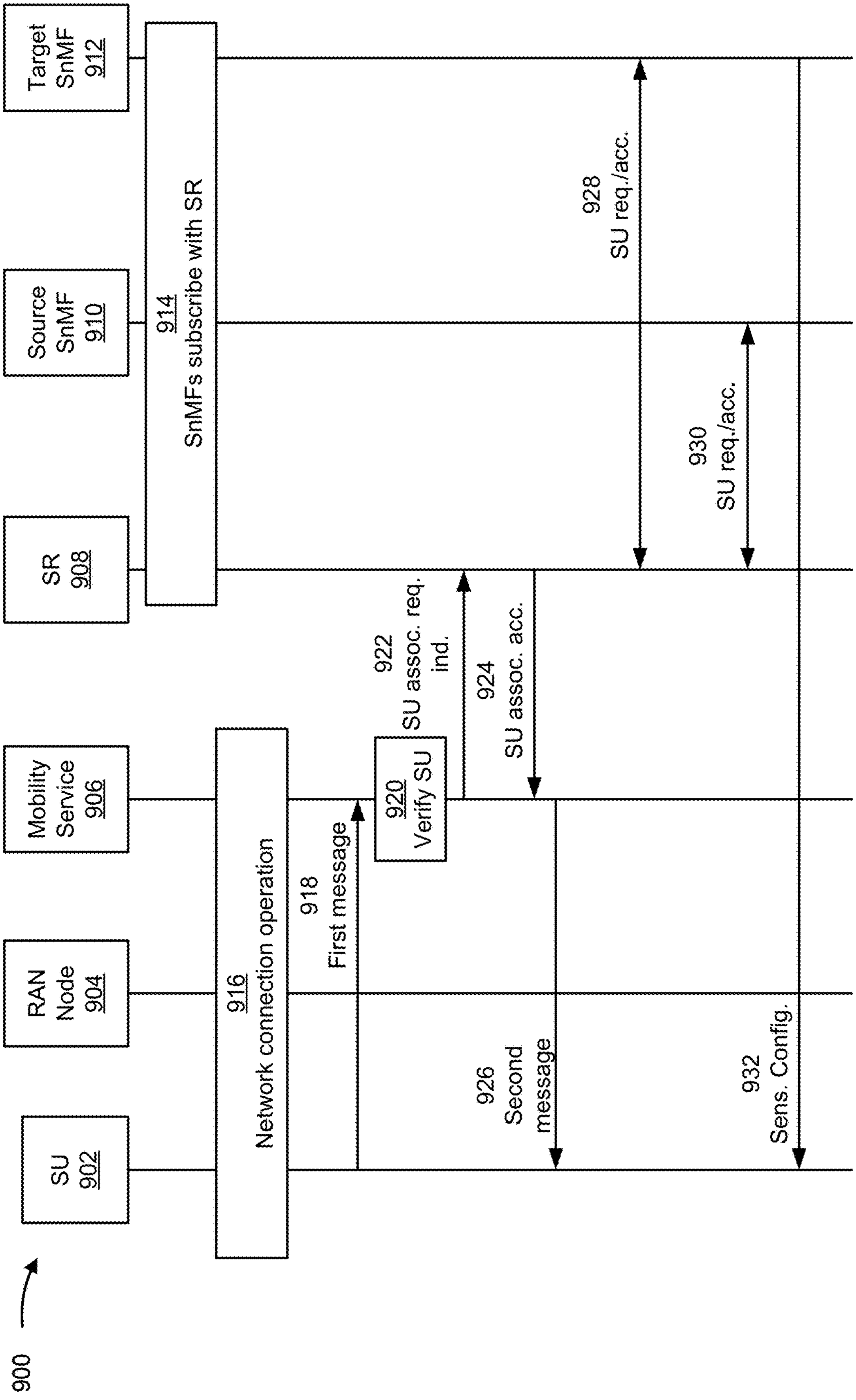
FIG. 9 is a diagram illustrating example operations associated with changing an SnMF in association with a handover of an SU in accordance with the present disclosure.

FIG. 9 is a diagram illustrating example operations 900 associated with changing an SnMF in association with a handover of an SU in accordance with the present disclosure. In the example operations 900, a common sensing repository (SR 908) may be implemented. As shown in FIG. 9, an SU 902, a RAN node 904, a mobility service 906, the SR 908, a source SnMF 910, and a target SnMF 912 may communicate with each other. The SU 902, the RAN node 904, the mobility service 906, the SR 908, the source SnMF 910, and the target SnMF 912 may communicate via one or more network interfaces. The one or more network interfaces may include wired connections, wireless connections, and/or logical connections. For example, the mobility service 906, the SR 908, the source SnMF 910, and the target SnMF 912 may be network functions of a core network for a wireless communication network, such as the wireless communication network 100 (for example, as described in more detail elsewhere herein). In some examples, the SU 902 may be, be similar to, include, or be included in, the UE 120 depicted in FIGS. 1-3. In some examples, any one or more of the RAN node 904, the mobility service 906, the SR 908, the source SnMF 910, and the target SnMF 912 may be, be similar to, include, or be included in, the network node 110 depicted in FIGS. 1 and 2, and/or one or more components of the disaggregated base station architecture 300 depicted in FIG. 3.

In some examples, the SR 908, the source SnMF 910, and the target SnMF 912 may be standalone network functions. In some other examples, one or more of the SR 908, the source SnMF 910, and the target SnMF 912 may be included in another network function, such as a service discovery function, an AMF or mobility service, a gateway (for example, a sensing gateway), or another network function. In some aspects, the SR 908, the source SnMF 910, and the target SnMF 912 may be referred to as gateways or sensing gateways. For example, the SR 908, the source SnMF 910, and the target SnMF 912 may be logical functions configured to select an SnMF node to be associated with a sensing request (for example, configured to select an SnMF node to serve a sensing request).

In some aspects, the SR 908 may keep track of SUs 902. For example, the SR 908 may maintain a list of active SUs 902 and their associated sensing session IDs, SnMF service areas, and/or SnMFs. In aspects depicted in FIG. 9, the SR 908 does not change as the SU 902 moves across SnMF service areas. For example, the SR 908 may serve as a repository for multiple SnMFs. Each of the multiple SnMFs may subscribe with the SR 908 to be notified of changes related to a set of SUs 902 in an associated service area. In this way, for example, if an SU 902 moves into or out of a sensing service area associated with a registered SnMF, the SR 908 may notify the registered SnMF of the change (e.g., that the SU 902 moved into or out of the SnMF service area).

After the change of the SnMF service area, when the SU 902 connects to the network, the SU 902 may provide an SU association request to the mobility service 906. The mobility service 906 may notify the SR 908 when the mobility service 906 receives the SU association request. For example, the mobility service 906 may route the SU association request to the SR 908, providing location information associated with the SU 902. The location information may include a geographic location of the SU 902 and/or a cell ID associated with a cell to which the SU 902 is connected, among other examples. For example, the SU 902 may indicate the SU location information in the message carrying the SU association request. Since the target SnMF 912 subscribes with the SR 908, the SR 908 may notify the target SnMF 912 upon receiving the SU association request from the SU 902. Thus, the SU 902 may become associated with the target SnMF 912. The SR 908 also may notify the source SnMF 910 upon receiving the SU association request, indicating that the SU 902 is no longer in the source SnMF service area. When the target SnMF 912 is notified of the SU 902 entering the service area associated with the target SnMF 912, the target SnMF 912 may configure the SU 902 for sensing.

If the SR 908 is not able to accept the association request, in its response to the mobility service 906, the SR 908 may indicate that the request is rejected and provide a routing ID corresponding to another suitable SR. The routing ID and the rejection indication may be forwarded to the SU 902, which may initiate an SU association request with the provided routing ID.

In an operation 914, the source SnMF 910 and the target SnMF 912 may subscribe with the SR 908. In an operation 916, the SU 902 may perform a UE connection operation to connect the SU 902 to a network provided by the RAN node 904. In an operation 918, the SU 902 may transmit, and the mobility service 906 may receive, a first message. The first message may include, for example, an NAS message. The first message may include a first SU association request associated with a handover of the SU 902 from a first SnMF service area to a second SnMF service area. For example, the first SnMF service area may be associated with the source SnMF 910 and the second SnMF service area may be associated with the target SnMF 912. In some aspects, the first message may include, for example, a routing ID associated with the source SnMF 910.

In an operation 920, the mobility service 906 may verify the SU 902 and, in an operation 922, the mobility service 906 may transmit, to the SR 908, an indication of the SU association request (shown in FIG. 9 as "SU assoc. req. ind."). In an operation 924, the SR 908 may transmit, and the mobility service 906 may receive, an indication of an SU association acceptance associated with the SU association request. In an operation 926, the mobility service 906 may transmit, and the SU 902 may receive, a second message. The second message may indicate the SU association acceptance and may include a routing ID associated with the target SnMF 912.

In some aspects, in an operation 928, the SR 908 and the target SnMF 912 may exchange SU association request and acceptance indications (shown in FIG. 9 as "SU req./acc."). For example, the SR 908 may provide an SU ID associated with the SU 902 to the target SnMF. In an operation 930, the SR 908 and the source SnMF 910 may exchange SU association request and accept indications and/or notifications. For example, the SR 908 may notify the source SnMF 910 of the SU's exiting of the SnMF service area associated with the source SnMF 910. In an operation 932, the target SnMF 912 may transmit, and the SU 902 may receive, a sensing configuration. The sensing configuration may configure the SU 902 for continuing a sensing session in the SnMF service area associated with the target SnMF 912.

Irrespective of SU movement, the areas and targets to be tracked may change over time. For example, as different SnMFs may be responsible for different areas, a new serving SnMF may have to be identified when an area is changed. The change in the target or area to be sensed may be known at the source SnMF (since the SnMF may be processing the sensing data to make detections); hence an SnMF may determine that a change in SnMF is needed. Additionally or alternatively, as the target or area changes, SUs to be used for sensing may also change over time.

Figure 10:
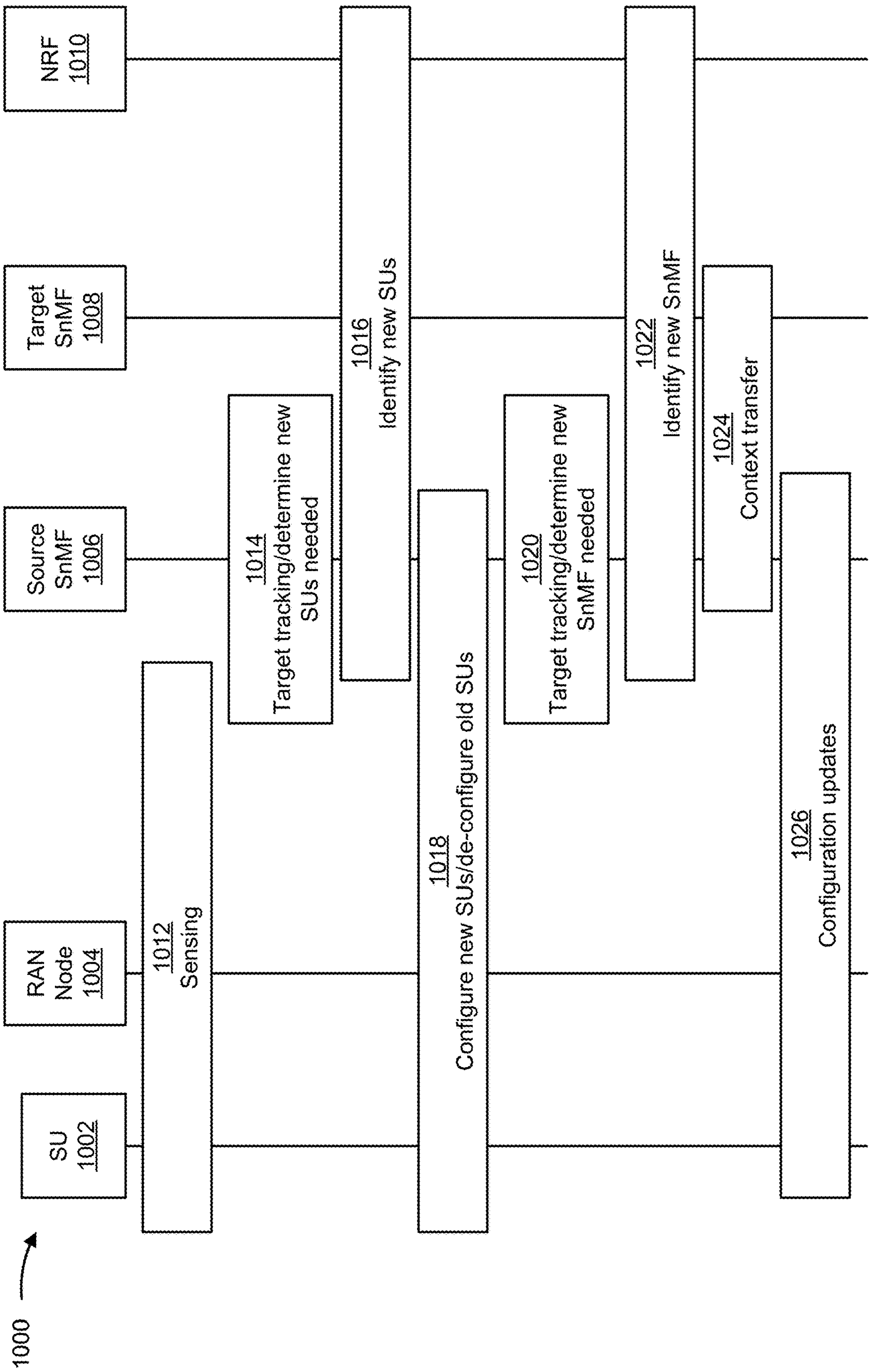
FIG. 10 is a diagram illustrating example operations associated with changing an SnMF in association with a change of a target and/or an SnMF service area in accordance with the present disclosure.

FIG. 10 is a diagram illustrating example operations 1000 associated with changing an SnMF in association with a change of a target and/or an SnMF service area in accordance with the present disclosure. As shown in FIG. 10, an SU 1002, a RAN node 1004, a source SnMF 1006, a target SnMF 1008, and an NRF 1010 may communicate with each other. The SU 1002, the RAN node 1004, the source SnMF 1006, the target SnMF 1008, and the NRF 1010 may communicate via one or more network interfaces. The one or more network interfaces may include wired connections, wireless connections, and/or logical connections. For example, the source SnMF 1006, the target SnMF 1008, and the NRF 1010 may be network functions of a core network for a wireless communication network, such as the wireless communication network 100 (for example, as described in more detail elsewhere herein). In some examples, the SU 1002 may be, be similar to, include, or be included in, the UE 120 depicted in FIGS. 1-3. In some examples, any one or more of the RAN node 1004, the source SnMF 1006, the target SnMF 1008, and the NRF 1010 may be, be similar to, include, or be included in, the network node 110 depicted in FIGS. 1 and 2, and/or one or more components of the disaggregated base station architecture 300 depicted in FIG. 3.

In some examples, the source SnMF 1006, the target SnMF 1008, and/or the NRF 1010 may be standalone network functions. In some other examples, one or more of the source SnMF 1006, the target SnMF 1008, and the NRF 1010 may be included in another network function, such as a service discovery function, an AMF or mobility service, a gateway (for example, a sensing gateway), or another network function. In some aspects, the source SnMF 1006, the target SnMF 1008, and the NRF 1010 may be referred to as gateways or sensing gateways. For example, the source SnMF 1006, the target SnMF 1008, and the NRF 1010 may be logical functions configured to select an SnMF node to be associated with a sensing request (for example, configured to select an SnMF node to serve a sensing request).

In some aspects, a sensing operation may be used to actively track an area and/or a target. The source SnMF 1006 may determine that a different set of SUs is needed due to the change. The source SnMF 1006 may request identities for the new potential SUs serving the new area to the NRF 1010 or to an SR (not shown). The source SnMF 1006 may then de-configure the SUs that are not needed, and configure new SUs to sense the new area. In another case, the source SnMF 1006 may identify that the target is exiting an SnMF service area associated with the source SnMF 1006. The source SnMF 1006 may then identify a new SnMF (e.g., the target SnMF 1008) by querying the NRF 1010 or other service discovery function, including information on the current sensing request. Once the new SnMF is found, the source SnMF 1006 may request a transfer of context, to preserve the service continuity. In some aspects, the context may include information for the target SnMF 1008 to expose the results (e.g., the context may indicate the need to change the reporting link to a new gateway or client). After the transfer is concluded, certain SUs may be re-configured with the target SnMF 1008, and the target SnMF 1008 may configure additional new SUs to serve the request.

In an operation 1012, the SU 1002 and the RAN node 1004 may engage in sensing operations. In an operation 1014, the source SnMF 1006 may perform target tracking and/or may determine that new SUs are needed. In an operation 1016, the source SnMF 1006, the target SnMF 1008, and/or the NRF 1010 may identify new SUs. In an operation 1018, the source SnMF may de-configure old SUs (e.g., SUs that are not to be used for sensing after a change in the target and/or area) and/or configure new SUs for sensing. In an operation 1020, the source SnMF 1006 may perform target tracking and/or may determine that a new SnMF is needed. In an operation 1022, the source SnMF 1006, the target SnMF 1008, and/or the NRF 1010 may identify a new SnMF (e.g., the target SnMF 1008). In an operation 1024, the source SnMF 1006 may transfer SU context to the target SnMF 1008. In an operation 1026, the source SnMF 1006 may provide configuration updates to the SU 902 as a result of the addition of the target SnMF 1008.

Figure 11:
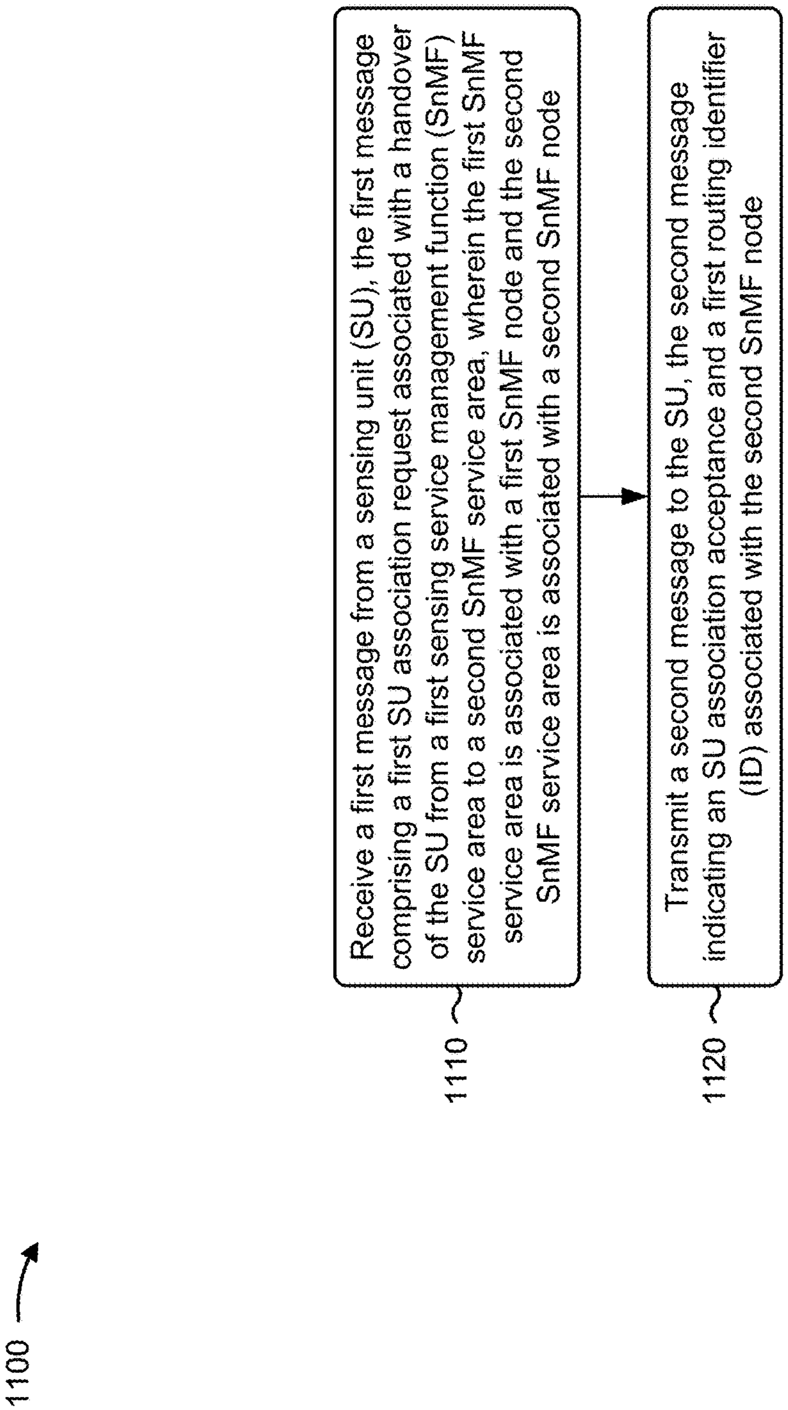
FIG. 11 is a flowchart illustrating an example process performed, for example, at a first network node or an apparatus of a first network node that supports sensing session operations in accordance with the present disclosure.

FIG. 11 is a flowchart illustrating an example process 1100 performed, for example, at a first network node or an apparatus of a first network node that supports sensing session operations in accordance with the present disclosure. Example process 1100 is an example where the apparatus or the first network node (for example, first network node 110) performs operations associated with changing an SnMF in association with a UE handover.

As shown in FIG. 11, in some aspects, process 1100 may include receiving a first message from an SU, the first message comprising a first SU association request associated with a handover of the SU from a first SnMF service area to a second SnMF service area, wherein the first SnMF service area is associated with a first SnMF node and the second SnMF service area is associated with a second SnMF node (block 1110). For example, the first network node (such as by using communication manager 1408 or reception component 1402, depicted in FIG. 14) may receive a first message from an SU, the first message comprising a first SU association request associated with a handover of the SU from a first SnMF service area to a second SnMF service area, wherein the first SnMF service area is associated with a first SnMF node and the second SnMF service area is associated with a second SnMF node, as described above.

As further shown in FIG. 11, in some aspects, process 1100 may include transmitting a second message to the SU, the second message indicating an SU association acceptance and a first routing ID associated with the second SnMF node (block 1120). For example, the first network node (such as by using communication manager 1408 or transmission component 1404, depicted in FIG. 14) may transmit a second message to the SU, the second message indicating an SU association acceptance and a first routing ID associated with the second SnMF node, as described above.

Process 1100 may include additional aspects, such as any single aspect or any combination of aspects described below or in connection with one or more other processes described elsewhere herein.

In a first additional aspect, process 1100 includes transmitting an indication of the first SU association request to the second SnMF node, and receiving an indication of the SU association acceptance from the SnMF node.

In a second additional aspect, alone or in combination with the first aspect, process 1100 includes receiving a third message comprising a second SU association request indicative of a second routing ID associated with a third SnMF node, transmitting an indication of the second SU association request to the third SnMF node, receiving, from the third SnMF node, an indication of an SU association rejection and an indication of the first routing ID, and transmitting a fourth message to the SU, wherein the fourth message indicates the SU association rejection.

In a third additional aspect, alone or in combination with one or more of the first and second aspects, process 1100 includes transmitting an indication of the first SU association request to a first sensory repository (SR) node, and receiving an indication of the SU association acceptance from the first SR.

In a fourth additional aspect, alone or in combination with one or more of the first through third aspects, the first SU association request comprises location information associated with the SU.

In a fifth additional aspect, alone or in combination with one or more of the first through fourth aspects, the location information indicates at least one of a geographic location of the SU or a cell ID associated with a cell to which the SU is connected.

In a sixth additional aspect, alone or in combination with one or more of the first through fifth aspects, process 1100 includes receiving a third message comprising a second SU association request, transmitting an indication of the second SU association request to a second SR node, receiving, from the second SR node, an SR rejection indication and an indication of a routing ID associated with the first SR node, and transmitting a fourth message to the SU, wherein the fourth message comprises the SR rejection indication and the routing ID associated with the first SR node, and wherein receiving the first message comprises receiving the first message in association with the SR rejection indication.

Although FIG. 11 shows example blocks of process 1100, in some aspects, process 1100 may include additional blocks, fewer blocks, different blocks, or differently arranged blocks than those depicted in FIG. 11. Additionally or alternatively, two or more of the blocks of process 1100 may be performed in parallel.

Figure 12:
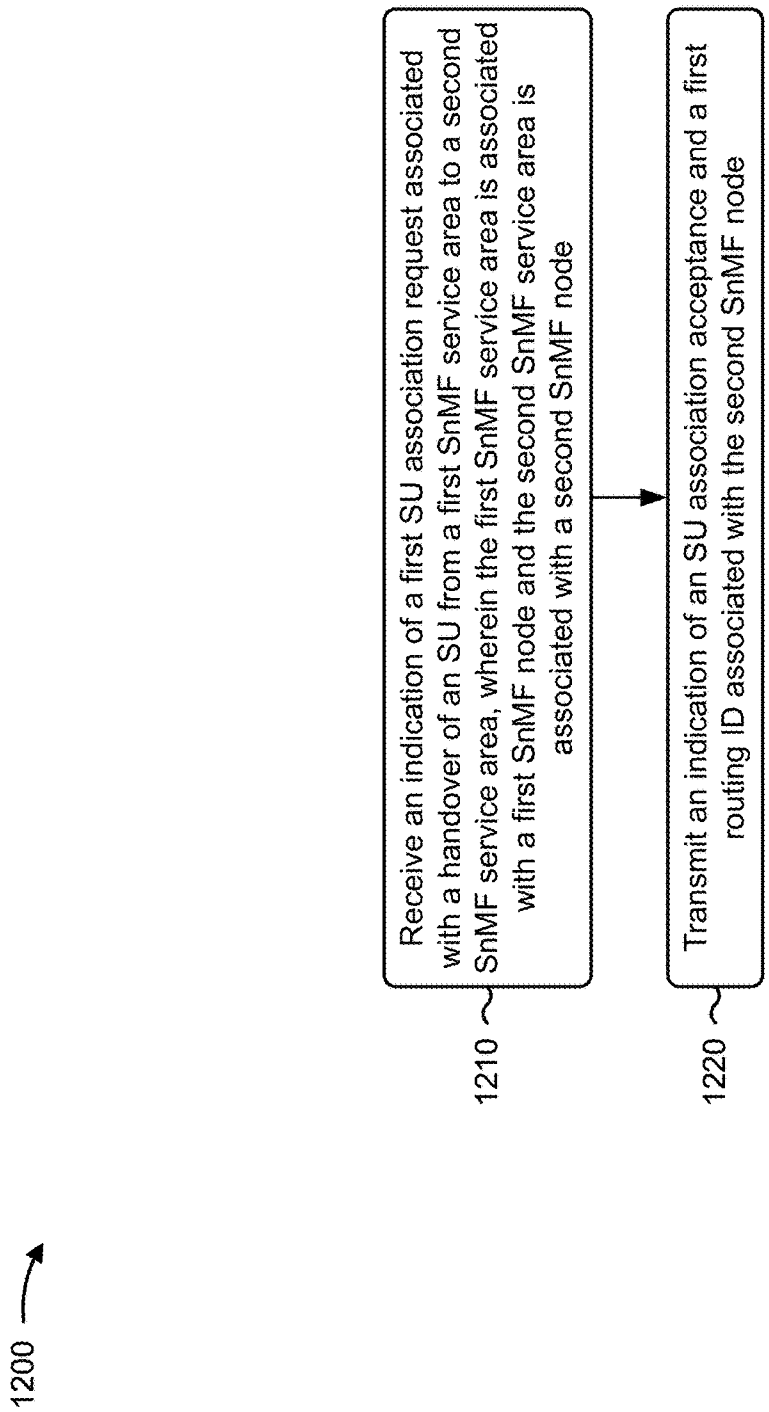
FIG. 12 is a flowchart illustrating an example process performed, for example, at a first network node or an apparatus of a first network node that supports sensing session operations in accordance with the present disclosure in accordance with the present disclosure.

FIG. 12 is a flowchart illustrating an example process 1200 performed, for example, at a first network node or an apparatus of a first network node that supports sensing session operations in accordance with the present disclosure in accordance with the present disclosure. Example process 1200 is an example where the apparatus or the first network node (for example, first network node 110) performs operations associated with changing an SnMF in association with a UE handover.

As shown in FIG. 12, in some aspects, process 1200 may include receiving an indication of a first SU association request associated with a handover of an SU from a first SnMF service area to a second SnMF service area, wherein the first SnMF service area is associated with a first SnMF node and the second SnMF service area is associated with a second SnMF node (block 1210). For example, the first network node (such as by using communication manager 1408 or reception component 1402, depicted in FIG. 14) may receive an indication of a first SU association request associated with a handover of an SU from a first SnMF service area to a second SnMF service area, wherein the first SnMF service area is associated with a first SnMF node and the second SnMF service area is associated with a second SnMF node, as described above.

As further shown in FIG. 12, in some aspects, process 1200 may include transmitting an indication of an SU association acceptance and a first routing ID associated with the second SnMF node (block 1220). For example, the first network node (such as by using communication manager 1408 or transmission component 1404, depicted in FIG. 14) may transmit an indication of an SU association acceptance and a first routing ID associated with the second SnMF node, as described above.

Process 1200 may include additional aspects, such as any single aspect or any combination of aspects described below or in connection with one or more other processes described elsewhere herein.

In a first additional aspect, the first network node comprises the second SnMF node.

In a second additional aspect, alone or in combination with the first aspect, process 1200 includes receiving SU context information from the first SnMF node.

In a third additional aspect, alone or in combination with one or more of the first and second aspects, the first network node comprises an SR node.

In a fourth additional aspect, alone or in combination with one or more of the first through third aspects, process 1200 includes receiving first subscription information from the first SnMF node, and receiving second subscription information from the second SnMF node.

In a fifth additional aspect, alone or in combination with one or more of the first through fourth aspects, process 1200 includes transmitting an indication of the first SU association request to the second SnMF node, and receiving the SU association acceptance from the second SnMF node.

In a sixth additional aspect, alone or in combination with one or more of the first through fifth aspects, process 1200 includes transmitting, to the first SnMF node, an indication that the SU is no longer located within the first SnMF service area.

In a seventh additional aspect, alone or in combination with one or more of the first through sixth aspects, the first SU association request comprises location information associated with the SU.

In an eighth additional aspect, alone or in combination with one or more of the first through seventh aspects, the location information indicates at least one of a geographic location of the SU or a cell ID associated with a cell to which the SU is connected.

Although FIG. 12 shows example blocks of process 1200, in some aspects, process 1200 may include additional blocks, fewer blocks, different blocks, or differently arranged blocks than those depicted in FIG. 12. Additionally or alternatively, two or more of the blocks of process 1200 may be performed in parallel.

Figure 13:
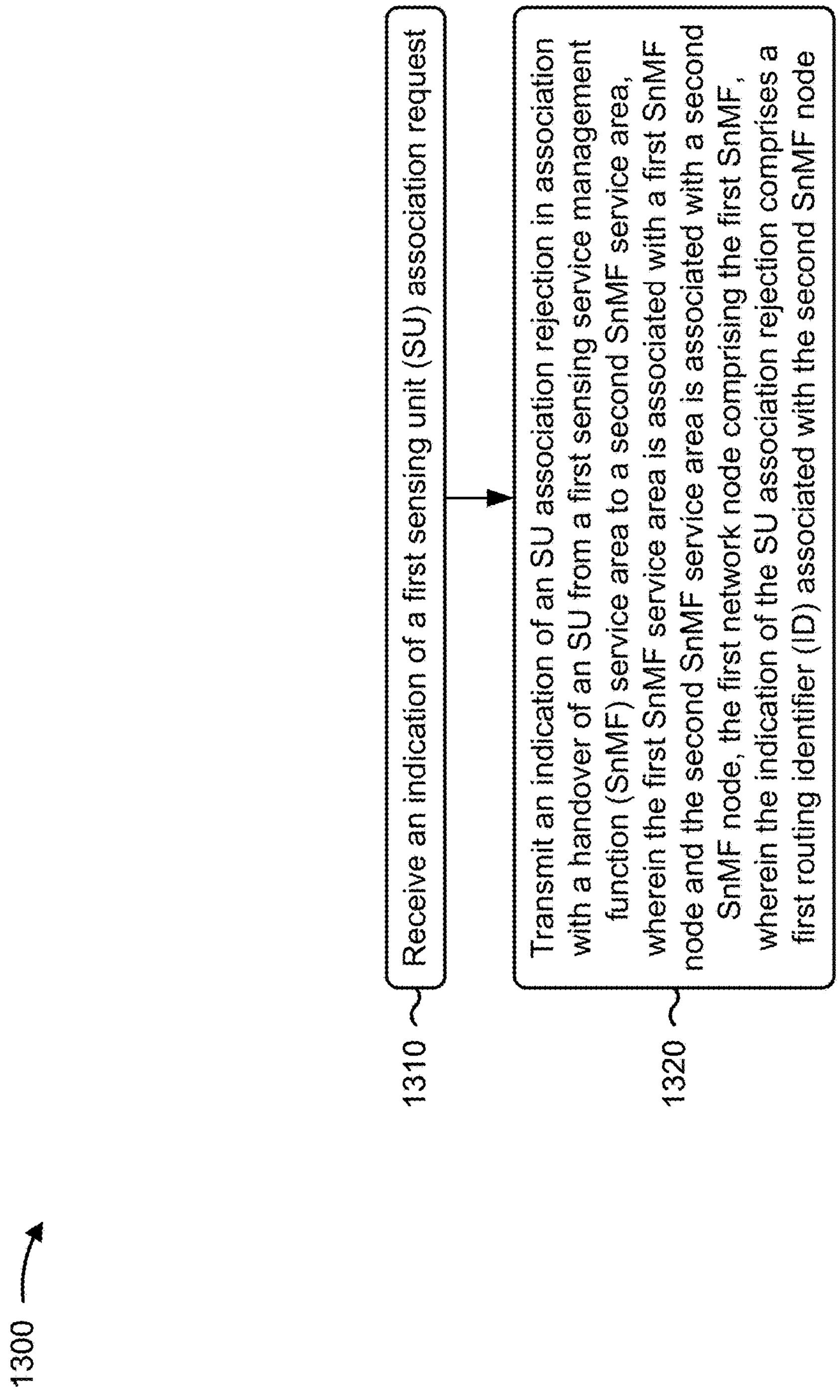
FIG. 13 is a flowchart illustrating an example process performed, for example, at a first network node or an apparatus of a first network node that supports sensing session operations in accordance with the present disclosure.

FIG. 13 is a flowchart illustrating an example process 1300 performed, for example, at a first network node or an apparatus of a first network node that supports sensing session operations in accordance with the present disclosure. Example process 1300 is an example where the apparatus or the first network node (for example, first network node 110) performs operations associated with changing an SnMF in association with a UE handover.

As shown in FIG. 13, in some aspects, process 1300 may include receiving an indication of a first SU association request (block 1310). For example, the first network node (such as by using communication manager 1408 or reception component 1402, depicted in FIG. 14) may receive an indication of a first SU association request, as described above.

As further shown in FIG. 13, in some aspects, process 1300 may include transmitting an indication of an SU association rejection in association with a handover of an SU from a first SnMF service area to a second SnMF service area, wherein the first SnMF service area is associated with a first SnMF node and the second SnMF service area is associated with a second SnMF node, the first network node comprising the first SnMF, wherein the indication of the SU association rejection comprises a first routing ID associated with the second SnMF node (block 1320). For example, the first network node (such as by using communication manager 1408 or transmission component 1404, depicted in FIG. 14) may transmit an indication of an SU association rejection in association with a handover of an SU from a first SnMF service area to a second SnMF service area, wherein the first SnMF service area is associated with a first SnMF node and the second SnMF service area is associated with a second SnMF node, the first network node comprising the first SnMF, wherein the indication of the SU association rejection comprises a first routing ID associated with the second SnMF node, as described above.

Process 1300 may include additional aspects, such as any single aspect or any combination of aspects described below or in connection with one or more other processes described elsewhere herein.

In a first additional aspect, process 1300 includes transmitting SU context information to the second SnMF node.

Although FIG. 13 shows example blocks of process 1300, in some aspects, process 1300 may include additional blocks, fewer blocks, different blocks, or differently arranged blocks than those depicted in FIG. 13. Additionally or alternatively, two or more of the blocks of process 1300 may be performed in parallel.

Figure 14:
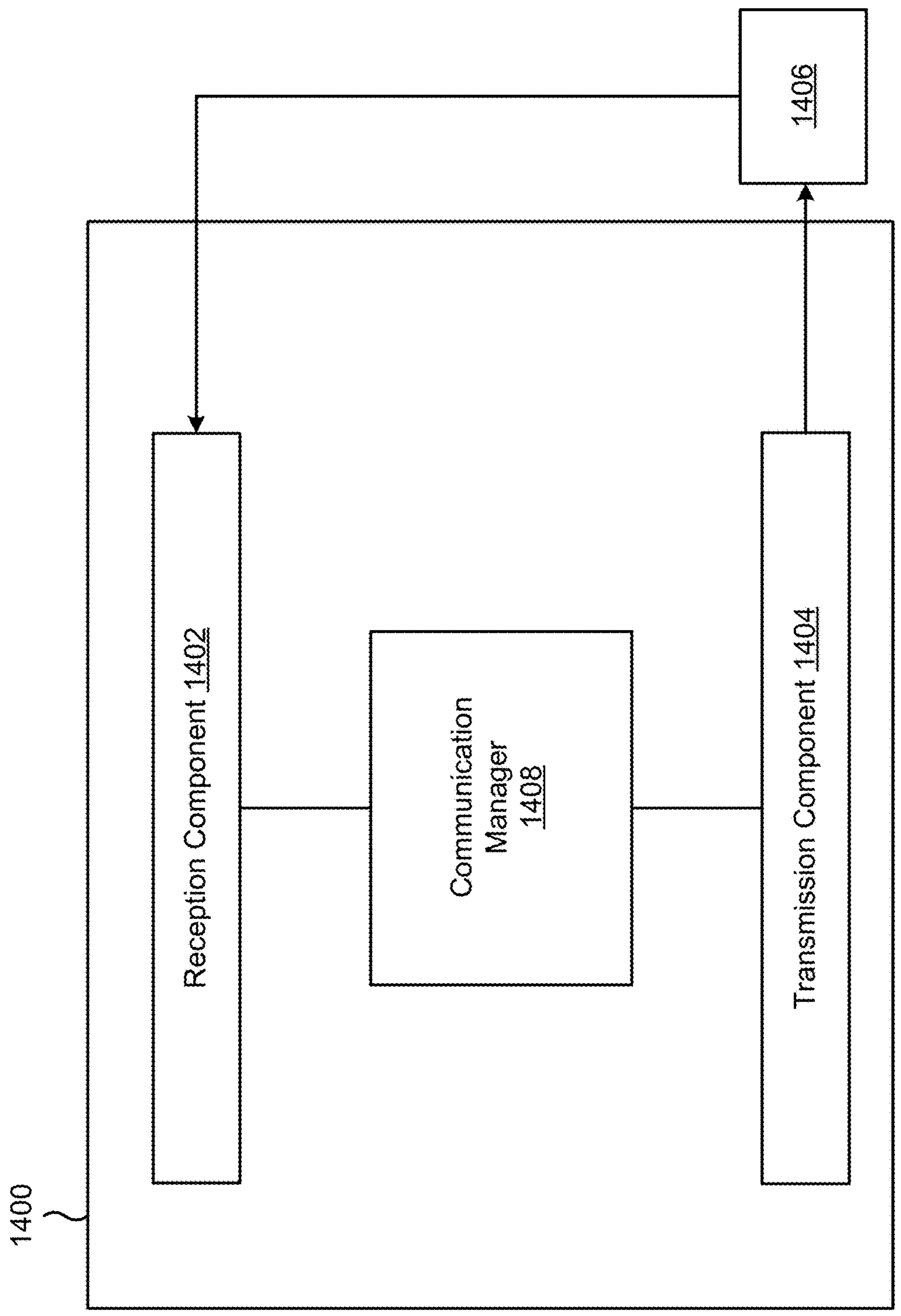
FIG. 14 is a diagram of an example apparatus for wireless communication that supports changing an SnMF in association with a UE handover in accordance with the present disclosure.

FIG. 14 is a diagram of an example apparatus 1400 for wireless communication that supports changing an SnMF in association with a UE handover in accordance with the present disclosure. The apparatus 1400 may be a first network node, or a first network node may include the apparatus 1400. In some aspects, the apparatus 1400 includes a reception component 1402, a transmission component 1404, and a communication manager 1408, which may be in communication with one another (for example, via one or more buses). As shown, the apparatus 1400 may communicate with another apparatus 1406 (such as a UE, a network node, or another wireless communication device) using the reception component 1402 and the transmission component 1404.

In some aspects, the apparatus 1400 may be configured to and/or operable to perform one or more operations described herein in connection with FIGS. 8-10. Additionally or alternatively, the apparatus 1400 may be configured to and/or operable to perform one or more processes described herein, such as process 1100 of FIG. 11, process 1200 of FIG. 12, and/or process 1300 of FIG. 13. In some aspects, the apparatus 1400 may include one or more components of the first network node described above in connection with FIG. 2.

The reception component 1402 may receive communications, such as reference signals, control information, and/or data communications, from the apparatus 1406. The reception component 1402 may provide received communications to one or more other components of the apparatus 1400, such as the communication manager 1408. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1402 may include one or more antennas, one or more modems, one or more demodulators, one or more MIMO detectors, one or more receive processors, one or more controllers/processors, and/or one or more memories of the first network node described above in connection with FIG. 2.

The transmission component 1404 may transmit communications, such as reference signals, control information, and/or data communications, to the apparatus 1406. In some aspects, the communication manager 1408 may generate communications and may transmit the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, one or more modems, one or more modulators, one or more transmit MIMO processors, one or more transmit processors, one or more controllers/processors, and/or one or more memories of the first network node described above in connection with FIG. 2. In some aspects, the transmission component 1404 may be co-located with the reception component 1402 in one or more transceivers. In some aspects, the communication manager 1408 may be, be similar to, include, or be included in, the communication manager 150 depicted in FIGS. 1 and 2. In some aspects, the communication manager 1408 may include the reception component 1402 and/or the transmission component 1404.

The communication manager 1408 may receive or may cause the reception component 1402 to receive a first message from an SU, the first message comprising a first SU association request associated with a handover of the SU from a first SnMF service area to a second SnMF service area, wherein the first SnMF service area is associated with a first SnMF node and the second SnMF service area is associated with a second SnMF node. The communication manager 1408 may transmit or may cause the transmission component 1404 to transmit a second message to the SU, the second message indicating an SU association acceptance and a first routing ID associated with the second SnMF node.

The communication manager 1408 may receive or may cause the reception component 1402 to receive an indication of a first SU association request associated with a handover of an SU from a first SnMF service area to a second SnMF service area, wherein the first SnMF service area is associated with a first SnMF node and the second SnMF service area is associated with a second SnMF node. The communication manager 1408 may transmit or may cause the transmission component 1404 to transmit an indication of an SU association acceptance and a first routing ID associated with the second SnMF node.

The communication manager 1408 may receive or may cause the reception component 1402 to receive an indication of a first SU association request. The communication manager 1408 may transmit or may cause the transmission component 1404 to transmit an indication of an SU association rejection in association with a handover of an SU from a first SnMF service area to a second SnMF service area, wherein the first SnMF service area is associated with a first SnMF node and the second SnMF service area is associated with a second SnMF node, the first network node comprising the first SnMF, wherein the indication of the SU association rejection comprises a first routing ID associated with the second SnMF node. In some aspects, the communication manager 1408 may perform one or more operations described elsewhere herein as being performed by one or more components of the communication manager 150.

The communication manager 1408 may include one or more controllers/processors, one or more memories, one or more schedulers, and/or one or more communication units of the first network node described above in connection with FIG. 2. In some aspects, the communication manager 1408 includes a set of components. Alternatively, the set of components may be separate and distinct from the communication manager 1408. In some aspects, one or more components of the set of components may include or may be implemented within one or more controllers/processors, one or more memories, one or more schedulers, and/or one or more communication units of the first network node described above in connection with FIG. 2. Additionally or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1402 may receive a first message from an SU, the first message comprising a first SU association request associated with a handover of the SU from a first SnMF service area to a second SnMF service area, wherein the first SnMF service area is associated with a first SnMF node and the second SnMF service area is associated with a second SnMF node. The transmission component 1404 may transmit a second message to the SU, the second message indicating an SU association acceptance and a first routing ID associated with the second SnMF node.

The transmission component 1404 may transmit an indication of the first SU association request to the second SnMF node.

The reception component 1402 may receive an indication of the SU association acceptance from the SnMF node.

The reception component 1402 may receive a third message comprising a second SU association request indicative of a second routing ID associated with a third SnMF node.

The transmission component 1404 may transmit an indication of the second SU association request to the third SnMF node.

The reception component 1402 may receive, from the third SnMF node, an indication of an SU association rejection and an indication of the first routing ID.

The transmission component 1404 may transmit a fourth message to the SU, wherein the fourth message indicates the SU association rejection.

The transmission component 1404 may transmit an indication of the first SU association request to a first SR node.

The reception component 1402 may receive an indication of the SU association acceptance from the first SR.

The reception component 1402 may receive a third message comprising a second SU association request.

The transmission component 1404 may transmit an indication of the second SU association request to a second SR node.

The reception component 1402 may receive, from the second SR node, an SR rejection indication and an indication of a routing ID associated with the first SR node.

The transmission component 1404 may transmit a fourth message to the SU, wherein the fourth message comprises the SR rejection indication and the routing ID associated with the first SR node, and wherein receiving the first message comprises receiving the first message in association with the SR rejection indication.

The reception component 1402 may receive an indication of a first SU association request associated with a handover of an SU from a first SnMF service area to a second SnMF service area, wherein the first SnMF service area is associated with a first SnMF node and the second SnMF service area is associated with a second SnMF node. The transmission component 1404 may transmit an indication of an SU association acceptance and a first routing ID associated with the second SnMF node.

The reception component 1402 may receive SU context information from the first SnMF node.

The reception component 1402 may receive first subscription information from the first SnMF node.

The reception component 1402 may receive second subscription information from the second SnMF node.

The transmission component 1404 may transmit an indication of the first SU association request to the second SnMF node.

The reception component 1402 may receive the SU association acceptance from the second SnMF node.

The transmission component 1404 may transmit, to the first SnMF node, an indication that the SU is no longer located within the first SnMF service area.

The reception component 1402 may receive an indication of a first SU association request. The transmission component 1404 may transmit an indication of an SU association rejection in association with a handover of an SU from a first SnMF service area to a second SnMF service area, wherein the first SnMF service area is associated with a first SnMF node and the second SnMF service area is associated with a second SnMF node, the first network node comprising the first SnMF, wherein the indication of the SU association rejection comprises a first routing ID associated with the second SnMF node.

The transmission component 1404 may transmit SU context information to the second SnMF node.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally or alternatively, a set of (one or more) components shown in FIG. 14 may perform one or more functions described as being performed by another set of components shown in FIG. 14.

Figure 15:
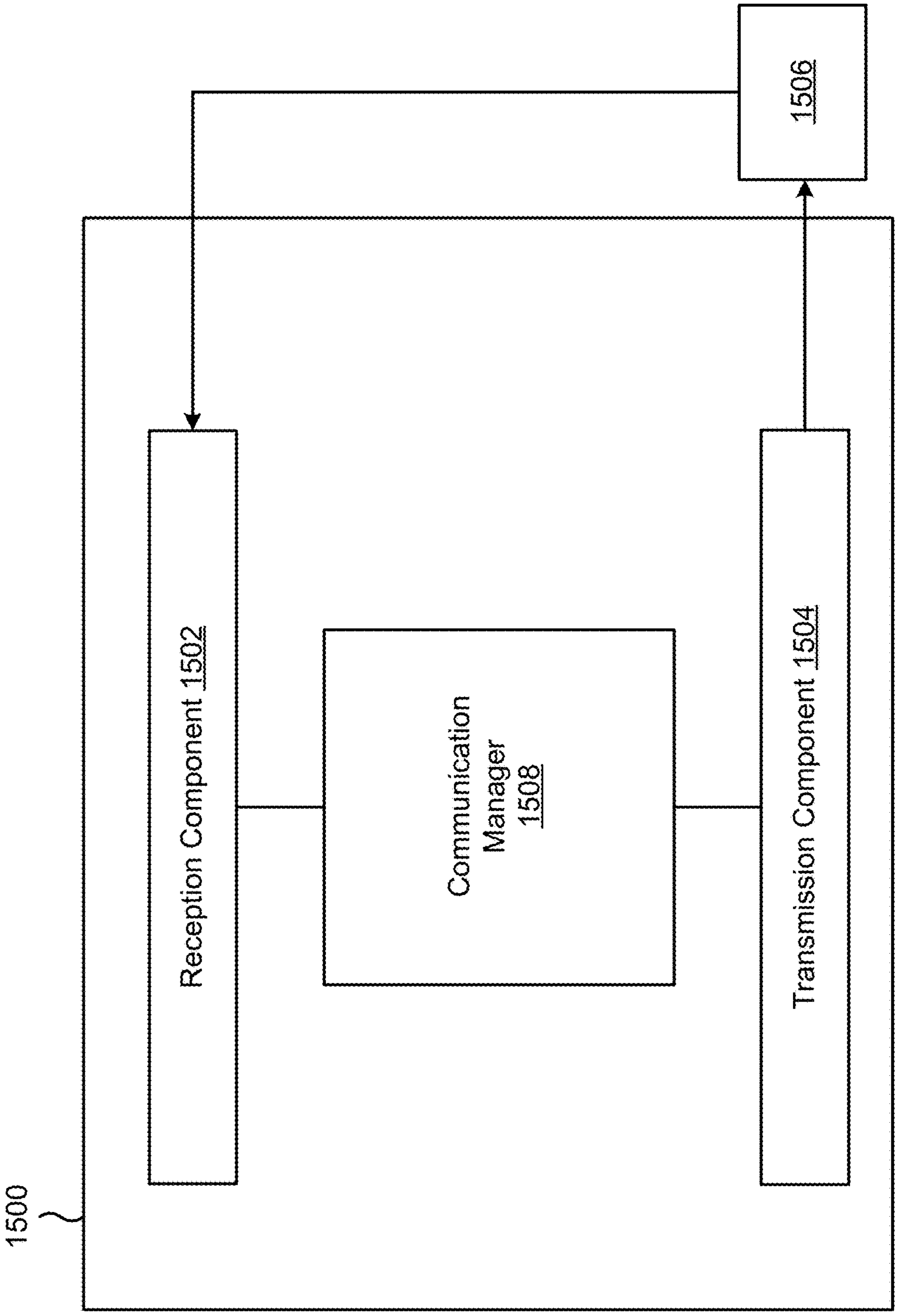
FIG. 15 is a diagram of an example apparatus for wireless communication that supports changing an SnMF in association with a UE handover in accordance with the present disclosure.

FIG. 15 is a diagram of an example apparatus 1500 for wireless communication that supports changing an SnMF in association with a UE handover in accordance with the present disclosure. The apparatus 1500 may be a UE, or a UE may include the apparatus 1500. In some aspects, the apparatus 1500 includes a reception component 1502, a transmission component 1504, and a communication manager 1508, which may be in communication with one another (for example, via one or more buses). As shown, the apparatus 1500 may communicate with another apparatus 1506 (such as a UE, a network node, or another wireless communication device) using the reception component 1502 and the transmission component 1504.

In some aspects, the apparatus 1500 may be configured to and/or operable to perform one or more operations described herein in connection with FIGS. 8-10. Additionally or alternatively, the apparatus 1500 may be configured to and/or operable to perform one or more processes described herein. In some aspects, the apparatus 1500 may include one or more components of the UE described above in connection with FIG. 2.

The reception component 1502 may receive communications, such as reference signals, control information, and/or data communications, from the apparatus 1506. The reception component 1502 may provide received communications to one or more other components of the apparatus 1500, such as the communication manager 140. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1502 may include one or more antennas, one or more modems, one or more demodulators, one or more MIMO detectors, one or more receive processors, one or more controllers/processors, and/or one or more memories of the UE described above in connection with FIG. 2.

The transmission component 1504 may transmit communications, such as reference signals, control information, and/or data communications, to the apparatus 1506. In some aspects, the communication manager 140 may generate communications and may transmit the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, one or more modems, one or more modulators, one or more transmit MIMO processors, one or more transmit processors, one or more controllers/processors, and/or one or more memories of the UE described above in connection with FIG. 2. In some aspects, the transmission component 1504 may be co-located with the reception component 1502 in one or more transceivers.

The communication manager 1508 may include one or more controllers/processors and/or one or more memories, of the UE described above in connection with FIG. 2. In some aspects, the communication manager 1508 includes a set of components. Alternatively, the set of components may be separate and distinct from the communication manager 1508. In some aspects, one or more components of the set of components may include or may be implemented within one or more controllers/processors and/or one or more memories of the UE described above in connection with FIG. 2. Additionally or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally or alternatively, a set of (one or more) components shown in FIG. 15 may perform one or more functions described as being performed by another set of components shown in FIG. 15.

The following provides an overview of some Aspects of the present disclosure:

Aspect 1: A method for wireless communication by a first network node, comprising: receiving a first message from a sensing unit (SU), the first message comprising a first SU association request associated with a handover of the SU from a first sensing service management function (SnMF) service area to a second SnMF service area, wherein the first SnMF service area is associated with a first SnMF node and the second SnMF service area is associated with a second SnMF node; and transmitting a second message to the SU, the second message indicating an SU association acceptance and a first routing identifier (ID) associated with the second SnMF node.

Aspect 2: The method of Aspect 1, further comprising: transmitting an indication of the first SU association request to the second SnMF node; and receiving an indication of the SU association acceptance from the SnMF node.

Aspect 3: The method of Aspect 2, further comprising: receiving a third message comprising a second SU association request indicative of a second routing ID associated with a third SnMF node; transmitting an indication of the second SU association request to the third SnMF node; receiving, from the third SnMF node, an indication of an SU association rejection and an indication of the first routing ID; and transmitting a fourth message to the SU, wherein the fourth message indicates the SU association rejection.

Aspect 4: The method of any of Aspects 1-3, further comprising: transmitting an indication of the first SU association request to a first sensory repository (SR) node; and receiving an indication of the SU association acceptance from the first SR.

Aspect 5: The method of Aspect 4, wherein the first SU association request comprises location information associated with the SU.

Aspect 6: The method of Aspect 5, wherein the location information indicates at least one of a geographic location of the SU or a cell identifier (ID) associated with a cell to which the SU is connected.

Aspect 7: The method of any of Aspects 4-6, further comprising: receiving a third message comprising a second SU association request; transmitting an indication of the second SU association request to a second SR node; receiving, from the second SR node, an SR rejection indication and an indication of a routing ID associated with the first SR node; and transmitting a fourth message to the SU, wherein the fourth message comprises the SR rejection indication and the routing ID associated with the first SR node, and wherein receiving the first message comprises receiving the first message in association with the SR rejection indication.

Aspect 8: A method for wireless communication performed by a first network node, comprising: receiving an indication of a first sensing unit (SU) association request associated with a handover of an SU from a first sensing service management function (SnMF) service area to a second SnMF service area, wherein the first SnMF service area is associated with a first SnMF node and the second SnMF service area is associated with a second SnMF node; and transmitting an indication of an SU association acceptance and a first routing identifier (ID) associated with the second SnMF node.

Aspect 9: The method of Aspect 8, wherein the first network node comprises the second SnMF node.

Aspect 10: The method of Aspect 9, further comprising receiving SU context information from the first SnMF node.

Aspect 11: The method of any of Aspects 8-10, wherein the first network node comprises a sensing repository (SR) node.

Aspect 12: The method of Aspect 11, further comprising: receiving first subscription information from the first SnMF node; and receiving second subscription information from the second SnMF node.

Aspect 13: The method of either of Aspects 11 or 12, further comprising: transmitting an indication of the first SU association request to the second SnMF node; and receiving the SU association acceptance from the second SnMF node.

Aspect 14: The method of any of Aspects 11-13, further comprising transmitting, to the first SnMF node, an indication that the SU is no longer located within the first SnMF service area.

Aspect 15: The method of any of Aspects 8-14, wherein the first SU association request comprises location information associated with the SU.

Aspect 16: The method of Aspect 15, wherein the location information indicates at least one of a geographic location of the SU or a cell identifier (ID) associated with a cell to which the SU is connected.

Aspect 17: A method for wireless communication performed by a first network node, comprising: receiving an indication of a first sensing unit (SU) association request; and transmitting an indication of an SU association rejection in association with a handover of an SU from a first sensing service management function (SnMF) service area to a second SnMF service area, wherein the first SnMF service area is associated with a first SnMF node and the second SnMF service area is associated with a second SnMF node, the first network node comprising the first SnMF, wherein the indication of the SU association rejection comprises a first routing identifier (ID) associated with the second SnMF node.

Aspect 18: The method of Aspect 17, further comprising transmitting SU context information to the second SnMF node.

Aspect 19: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-7.

Aspect 20: An apparatus for wireless communication at a device, the apparatus comprising one or more memories and one or more processors coupled to the one or more memories, the one or more processors configured to cause the device to perform the method of one or more of Aspects 1-7.

Aspect 21: An apparatus for wireless communication, the apparatus comprising at least one means for performing the method of one or more of Aspects 1-7.

Aspect 22: A non-transitory computer-readable medium storing code for wireless communication, the code comprising instructions executable by one or more processors to perform the method of one or more of Aspects 1-7.

Aspect 23: A non-transitory computer-readable medium storing a set of instructions for wireless communication, the set of instructions comprising one or more instructions that, when executed by one or more processors of a device, cause the device to perform the method of one or more of Aspects 1-7.

Aspect 24: A device for wireless communication, the device comprising a processing system that includes one or more processors and one or more memories coupled with the one or more processors, the processing system configured to cause the device to perform the method of one or more of Aspects 1-7.

Aspect 25: An apparatus for wireless communication at a device, the apparatus comprising one or more memories and one or more processors coupled to the one or more memories, the one or more processors individually or collectively configured to cause the device to perform the method of one or more of Aspects 1-7.

Aspect 26: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 8-16.

Aspect 27: An apparatus for wireless communication at a device, the apparatus comprising one or more memories and one or more processors coupled to the one or more memories, the one or more processors configured to cause the device to perform the method of one or more of Aspects 8-16.

Aspect 28: An apparatus for wireless communication, the apparatus comprising at least one means for performing the method of one or more of Aspects 8-16.

Aspect 29: A non-transitory computer-readable medium storing code for wireless communication, the code comprising instructions executable by one or more processors to perform the method of one or more of Aspects 8-16.

Aspect 30: A non-transitory computer-readable medium storing a set of instructions for wireless communication, the set of instructions comprising one or more instructions that, when executed by one or more processors of a device, cause the device to perform the method of one or more of Aspects 8-16.

Aspect 31: A device for wireless communication, the device comprising a processing system that includes one or more processors and one or more memories coupled with the one or more processors, the processing system configured to cause the device to perform the method of one or more of Aspects 8-16.

Aspect 32: An apparatus for wireless communication at a device, the apparatus comprising one or more memories and one or more processors coupled to the one or more memories, the one or more processors individually or collectively configured to cause the device to perform the method of one or more of Aspects 8-16.

Aspect 33: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 17-18.

Aspect 34: An apparatus for wireless communication at a device, the apparatus comprising one or more memories and one or more processors coupled to the one or more memories, the one or more processors configured to cause the device to perform the method of one or more of Aspects 17-18.

Aspect 35: An apparatus for wireless communication, the apparatus comprising at least one means for performing the method of one or more of Aspects 17-18.

Aspect 36: A non-transitory computer-readable medium storing code for wireless communication, the code comprising instructions executable by one or more processors to perform the method of one or more of Aspects 17-18.

Aspect 37: A non-transitory computer-readable medium storing a set of instructions for wireless communication, the set of instructions comprising one or more instructions that, when executed by one or more processors of a device, cause the device to perform the method of one or more of Aspects 17-18.

Aspect 38: A device for wireless communication, the device comprising a processing system that includes one or more processors and one or more memories coupled with the one or more processors, the processing system configured to cause the device to perform the method of one or more of Aspects 17-18.

Aspect 39: An apparatus for wireless communication at a device, the apparatus comprising one or more memories and one or more processors coupled to the one or more memories, the one or more processors individually or collectively configured to cause the device to perform the method of one or more of Aspects 17-18.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "associated with" is intended to mean "based on or otherwise in association with" unless explicitly stated otherwise. Also, as used herein, the term "or" is intended to be inclusive when used in a series and may be used interchangeably with "and/or," unless explicitly stated otherwise (for example, if used in combination with "either" or "only one of"). It should be understood that "one or more" is equivalent to "at least one."

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. A first network node for wireless communication, comprising:

a processing system that includes one or more processors and one or more memories coupled with the one or more processors, the processing system configured to cause the first network node to:

receive a first message from a sensing unit (SU), the first message comprising a first SU association request associated with a handover of the SU from a first sensing service management function (SnMF) service area to a second SnMF service area, wherein the first SnMF service area is associated with a first SnMF node and the second SnMF service area is associated with a second SnMF node; and transmit a second message to the SU, the second message indicating an SU association acceptance and a first routing identifier (ID) associated with the second SnMF node.

2. The first network node of claim 1, wherein the processing system is further configured to cause the first network node to:

transmit an indication of the first SU association request to the second SnMF node; and receive an indication of the SU association acceptance from the SnMF node.

3. The first network node of claim 2, wherein the processing system is further configured to cause the first network node to:

receive a third message comprising a second SU association request indicative of a second routing ID associated with a third SnMF node;

transmit an indication of the second SU association request to the third SnMF node;

receive, from the third SnMF node, an indication of an SU association rejection and an indication of the first routing ID; and transmit a fourth message to the SU, wherein the fourth message indicates the SU association rejection.

4. The first network node of claim 1, wherein the processing system is further configured to cause the first network node to:

transmit an indication of the first SU association request to a first sensory repository (SR) node; and receive an indication of the SU association acceptance from the first SR.

5. The first network node of claim 4, wherein the first SU association request comprises location information associated with the SU.

6. The first network node of claim 5, wherein the location information indicates at least one of a geographic location of the SU or a cell identifier (ID) associated with a cell to which the SU is connected.

7. The first network node of claim 4, wherein the processing system is further configured to cause the first network node to:

receive a third message comprising a second SU association request;

transmit an indication of the second SU association request to a second SR node;

receive, from the second SR node, an SR rejection indication and an indication of a routing ID associated with the first SR node; and transmit a fourth message to the SU, wherein the fourth message comprises the SR rejection indication and the routing ID associated with the first SR node, and wherein receiving the first message comprises receiving the first message in association with the SR rejection indication.

8. A first network node for wireless communication, comprising:

a processing system that includes one or more processors and one or more memories coupled with the one or more processors, the processing system configured to cause the first network node to:

receive an indication of a first sensing unit (SU) association request associated with a handover of an SU from a first sensing service management function (SnMF) service area to a second SnMF service area, wherein the first SnMF service area is associated with a first SnMF node and the second SnMF service area is associated with a second SnMF node; and transmit an indication of an SU association acceptance and a first routing identifier (ID) associated with the second SnMF node.

9. The first network node of claim 8, wherein the first network node comprises the second SnMF node.

10. The first network node of claim 9, wherein the processing system is further configured to cause the first network node to receive SU context information from the first SnMF node.

11. The first network node of claim 8, wherein the first network node comprises a sensing repository (SR) node.

12. The first network node of claim 11, wherein the processing system is further configured to cause the first network node to:

receive first subscription information from the first SnMF node; and receive second subscription information from the second SnMF node.

13. The first network node of claim 11, wherein the processing system is further configured to cause the first network node to:

transmit an indication of the first SU association request to the second SnMF node; and receive the SU association acceptance from the second SnMF node.

14. The first network node of claim 11, wherein the processing system is further configured to cause the first network node to transmit, to the first SnMF node, an indication that the SU is no longer located within the first SnMF service area.

15. The first network node of claim 8, wherein the first SU association request comprises location information associated with the SU.

16. The first network node of claim 15, wherein the location information indicates at least one of a geographic location of the SU or a cell identifier (ID) associated with a cell to which the SU is connected.

17. A first network node for wireless communication, comprising:

a processing system that includes one or more processors and one or more memories coupled with the one or more processors, the processing system configured to cause the first network node to:

receive an indication of a first sensing unit (SU) association request; and transmit an indication of an SU association rejection in association with a handover of an SU from a first sensing service management function (SnMF) service area to a second SnMF service area, wherein the first SnMF service area is associated with a first SnMF node and the second SnMF service area is associated with a second SnMF node, the first network node comprising the first SnMF, wherein the indication of the SU association rejection comprises a first routing identifier (ID) associated with the second SnMF node.

18. The first network node of claim 17, wherein the processing system is further configured to cause the first network node to transmit SU context information to the second SnMF node.

19. A method for wireless communication by a first network node, comprising:

receiving a first message from a sensing unit (SU), the first message comprising a first sensing unit (SU) association request associated with a handover of the SU from a first sensing service management function (SnMF) service area to a second SnMF service area, wherein the first SnMF service area is associated with a first SnMF node and the second SnMF service area is associated with a second SnMF node; and transmitting a second message to the SU, the second message indicating an SU association acceptance and a first routing identifier (ID) associated with the second SnMF node.

20. The method of claim 19, further comprising:

transmitting an indication of the first SU association request to the second SnMF node; and receiving an indication of the SU association acceptance from the SnMF node.

21. The method of claim 20, further comprising:

receiving a third message comprising a second SU association request indicative of a second routing ID associated with a third SnMF node;

transmitting an indication of the second SU association request to the third SnMF node;

receiving, from the third SnMF node, an indication of an SU association rejection and an indication of the first routing ID; and transmitting a fourth message to the SU, wherein the fourth message indicates the SU association rejection.

22. The method of claim 19, further comprising:

transmitting an indication of the first SU association request to a first sensory repository (SR) node; and receiving an indication of the SU association acceptance from the first SR.

23. The method of claim 22, wherein the first SU association request comprises location information associated with the SU.

24. The method of claim 23, wherein the location information indicates at least one of a geographic location of the SU or a cell identifier (ID) associated with a cell to which the SU is connected.

25. The method of claim 22, further comprising:

receiving a third message comprising a second SU association request;

transmitting an indication of the second SU association request to a second SR node;

receiving, from the second SR node, an SR rejection indication and an indication of a routing ID associated with the first SR node; and transmitting a fourth message to the SU, wherein the fourth message comprises the SR rejection indication and the routing ID associated with the first SR node, and wherein receiving the first message comprises receiving the first message in association with the SR rejection indication.

* * * * *